United States Patent
Li et al.

(10) Patent No.: US 11,606,306 B2
(45) Date of Patent: Mar. 14, 2023

(54) PACKET TRANSMISSION METHOD AND APPARATUS

(71) Applicant: HUAWEI TECHNOLOGIES CO., LTD., Shenzhen (CN)

(72) Inventors: Yongcui Li, Beijing (CN); Yan Li, Beijing (CN); Hui Ni, Beijing (CN); Fangyuan Zhu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 25 days.

(21) Appl. No.: 17/145,387

(22) Filed: Jan. 10, 2021

(65) Prior Publication Data

US 2021/0336893 A1    Oct. 28, 2021

Related U.S. Application Data

(63) Continuation of application No. PCT/CN2019/098452, filed on Jul. 30, 2019.

(30) Foreign Application Priority Data

Aug. 2, 2018 (CN) .......................... 201810872378.9

(51) Int. Cl.
  *H04L 47/34* (2022.01)
  *H04L 47/2425* (2022.01)
  *H04L 47/70* (2022.01)

(52) U.S. Cl.
  CPC .......... *H04L 47/34* (2013.01); *H04L 47/2425* (2013.01); *H04L 47/825* (2013.01)

(58) Field of Classification Search
  CPC ...... H04L 69/22; H04W 40/24; H04W 36/08; H04W 76/15; H04W 72/0453;
  (Continued)

(56) References Cited

U.S. PATENT DOCUMENTS 5,530,703 A    6/1996  Liu et al.
2012/0110372 A1*  5/2012  Borgendale ............. H04L 67/26
                                                    714/E11.073
(Continued)

FOREIGN PATENT DOCUMENTS

CN        104041119 A     9/2014
CN        105871737 A     8/2016
(Continued)

OTHER PUBLICATIONS

3GPP TS 23.501 V15.2.0, 3rd Generation Partnership Project, Technical Specification Group Services and System Aspects, System Architecture for the 5G System, Stage 2 (Release 15), Jun. 2018, 217 pages.
(Continued)

*Primary Examiner* — Joseph E Avellino
*Assistant Examiner* — Mon Cheri S Davenport
(74) *Attorney, Agent, or Firm* — Maier & Maier, PLLC

(57) ABSTRACT

Various embodiments provide a packet transmission method and an apparatus. In those embodiments, a first device supports a first protocol layer, and replicates a packet at the first protocol layer. A second device supports a second protocol layer, and deduplicates the packet at the second protocol layer. When receiving a first packet, a first access device converts a sequence number of the first protocol layer in the first packet into a sequence number of the second protocol layer, and then sends, to the second device, a second packet that carries the sequence number of the second protocol layer and a data packet of the first packet. For example, if the first access network device receives two packets having same data packets, the first access network device separately coverts sequence numbers in the two packets without performing operations of first deduplicating and then replicating the packet.

18 Claims, 11 Drawing Sheets

(58) Field of Classification Search
CPC ... H04W 36/0033; H04W 76/27; H04W 8/08; H04W 80/02; H04W 80/10
See application file for complete search history.

(56) References Cited

U.S. PATENT DOCUMENTS

| | | | |
|---|---|---|---|
| 2018/0098250 A1 | 4/2018 | Vrzic et al. | |
| 2018/0203604 A1 | 7/2018 | Bahl et al. | |
| 2020/0252862 A1* | 8/2020 | Kim | H04W 60/00 |

FOREIGN PATENT DOCUMENTS

| | | | |
|---|---|---|---|
| CN | 106506271 A | 3/2017 | |
| CN | 106559511 A | 4/2017 | |
| CN | 108234931 A | 6/2018 | |
| WO | 2017182927 A1 | 10/2017 | |

OTHER PUBLICATIONS

3GPP TS 36.323, V15.0.0, 3rd Generation Partnership Project; Technical Specification Group Radio Access Network; Evolved Universal Terrestrial Radio Access (E-UTRA); Packet Data Convergence Protocol (PDCP) specification (Release 15), Jul. 2018, 51 pages.

3GPP TS 38.300 V15.2.0, 3rd Generation Partnership Project;Technical Specification Group Radio Access Network NR; NR and NG-RAN Overall Description; Stage 2(Release 15), Jun. 2018, 87 pages.

3GPP TR 38.913 V15.0.0, 3rd Generation Partnership Project; Technical Specification Group Radio Access Network; Study on Scenarios and Requirements for Next Generation Access Technologies; (Release 15), Jun. 2018, 39 pages.

Samsung. "Solution for establishing N3 and N9 tunnels for redundant transmission." SA WG2 Meeting #128, S2-186721, Jul. 2-6, 2018. Vilnius, Lithuania. 2 pages.

* cited by examiner

PACKET TRANSMISSION METHOD AND APPARATUS

CROSS-REFERENCE TO RELATED APPLICATIONS

This application is a continuation of International Application No. PCT/CN2019/098452, filed on Jul. 30, 2019, which claims priority to Chinese Patent Application No. 201810872378.9, filed on Aug. 2, 2018. The aforementioned applications are hereby incorporated by reference in their entireties.

TECHNICAL FIELD

This application relates to the field of mobile communications technologies, and in particular, to a packet transmission method and an apparatus.

BACKGROUND

In some scenarios of 5th generation (5G) communication, for example, a scenario of ultra-reliable low-latency communication (URLLC), a packet needs to be transmitted with high reliability.

To transmit of a packet of a service flow with high reliability, a sending device replicates a to-be-sent packet at a first protocol layer of the sending device to obtain two packets, and then sends the two packets to an access network device. After receiving the two packets, the access network device first performs deduplication processing at a first protocol layer, then replicates the packet at a second protocol layer to obtain two packets, and sends the two packets to a receiving device. The receiving device deduplicates the two received packets at a second protocol layer. In this way, the packet can be transmitted with high reliability.

Because the access network device needs to first deduplicate the packets and then replicate the packet, overheads of the access network device are relatively high.

SUMMARY

Various embodiments provide a packet transmission method and an apparatus, to reduce overheads of an access network device when the access network device transmits a packet with high reliability.

According to a first aspect, a packet transmission method is provided. The method includes: A first access network device receives a first packet that is from a first device. The first packet includes a sequence number of a first protocol layer and a data packet of a first service flow. If the first access network device determines that conversion of the sequence number of the first protocol layer needs to be performed on the first packet, the first access network device determines, based on the sequence number of the first protocol layer of the first packet, a sequence number that is of a second protocol layer and that corresponds to the data packet. The first access network device sends a second packet to a second device. The second packet includes the sequence number of the second protocol layer and the data packet. Based on the solution, the first device supports the first protocol layer, and the first device replicates a packet at the first protocol layer. The second device supports the second protocol layer, and the second device deduplicates the packet at the second protocol layer. Therefore, when receiving the first packet, the first access device converts the sequence number of the first protocol layer in the first packet into the sequence number of the second protocol layer, and then sends, to the second device, the second packet that carries the sequence number of the second protocol layer and the data packet of the first packet. For example, if the first access network device receives two packets having same data packets, the first access network device separately coverts sequence numbers in the two packets without performing operations of first deduplicating and then replicating the packet. Therefore, overheads of the first access network device can be reduced.

For example, in an implementation, the first access network device further receives a third packet that is from the first device. The third packet includes a sequence number of the first protocol layer and a data packet of the first service flow. The sequence number that is of the first protocol layer and that is included in the first packet is the same as the sequence number that is of the first protocol layer and that is included in the third packet, and the data packet that is of the first service flow and that is included in the first packet is the same as the data packet that is of the first service flow and that is included in the third packet. If the first access network device determines that conversion of the sequence number of the first protocol layer needs to be performed on the third packet, the first access network device determines, based on the sequence number of the first protocol layer of the third packet, the sequence number that is of the second protocol layer and that corresponds to the data packet. Then, the first access network device sends a fourth packet to the second device. The fourth packet includes a sequence number of the second protocol layer and a data packet of the first service flow, and the sequence number that is of the second protocol layer and that is included in the second packet is the same as the sequence number that is of the second protocol layer and that is included in the fourth packet. Therefore, when receiving the first packet and the third packet that each carry the same data packet of the first service flow and the same sequence number of the first protocol layer, the first access network device does not need to deduplicate the first packet and the third packet, but converts the sequence number of the first protocol layer of the first packet to obtain the sequence number of the second protocol layer and converts the sequence number of the first protocol layer of the third packet to obtain the sequence number of the second protocol layer, respectively, and separately sends, to a terminal, the second packet and the fourth packet that each carry the data packet of the first service flow and the sequence number of the second protocol layer. In this way, the overheads of the first access network device can be reduced.

For another example, in another implementation, the first access network device may further record a correspondence between the sequence number of the first protocol layer of the first packet and the sequence number that is of the second protocol layer and that corresponds to the data packet of the first service flow. The first access network device receives a third packet that is from the first device. The third packet includes a sequence number of the first protocol layer and a data packet of the first service flow. The sequence number that is of the first protocol layer and that is included in the first packet is the same as the sequence number that is of the first protocol layer and that is included in the third packet, and the data packet that is of the first service flow and that is included in the first packet is the same as the data packet that is of the first service flow and that is included in the third packet. If the first access network device determines that conversion of the sequence number of the first protocol layer needs to be performed on the third packet, the first access network device determines, based on the correspondence and the sequence number of the first protocol layer of the third packet, the sequence number that is of the second protocol layer and that corresponds to the data packet of the first service flow. Then, the first access network device sends a fourth packet to the second device. The fourth packet includes a sequence number of the second protocol layer and a data packet of the first service flow, and the sequence number that is of the second protocol layer and that is included in the second packet is the same as the sequence number that is of the second protocol layer and that is included in the fourth packet. Therefore, when receiving the first packet and the third packet that each carry the same data packet of the first service flow and the same sequence number of the first protocol layer, the first access network device does not need to deduplicate the first packet and the third packet, but converts the sequence number of the first protocol layer of the first packet to obtain the sequence number of the second protocol layer and obtains the sequence number of the second protocol layer based on the sequence number of the first protocol layer of the third packet and the correspondence, and separately sends, to the second device, the second packet and the fourth packet that each carry the data packet of the first service flow and the sequence number of the second protocol layer. In this way, the overheads of the first access network device can be reduced.

For example, in the foregoing embodiment, the first access network device may determine, based on any one of the following methods, that the conversion of the sequence number of the first protocol layer needs to be performed on the first packet.

Method 1: If the first access network device determines that a redundant transmission path exists between the first access network device and the second device, the first access network device determines that the conversion of the sequence number of the first protocol layer needs to be performed on the first packet.

The redundant transmission path means that at least two transmission paths (or referred to as transmission channels or referred to as channels) exist between the first access network device and the second device.

Method 2: The first access network device determines, based on an indication received from a core network control plane, that the conversion of the sequence number of the first protocol layer needs to be performed on the first packet.

For example, a session management network element on the core network control plane sends the indication to the first access network device, and the indication is used to indicate that the conversion of the sequence number of the first protocol layer needs to be performed on the packet of the first service flow. Therefore, when receiving the first packet, the first access network device determines that the conversion of the sequence number of the first protocol layer needs to be performed on the first packet.

Method 3: If the first access network device determines, based on an indication received from a core network control plane, that a redundant transmission path exists between the first access network device and the second device, the first access network device determines that the conversion of the sequence number of the first protocol layer needs to be performed on the first packet.

The method is a combination of Method 1 and Method 2. It needs to be determined, based on the indication of the core network control plane, that the redundant transmission path exists between the first access network device and the second device, and then it is determined that the conversion of the sequence number of the first protocol layer needs to be performed on the first packet.

According to any one of Method 1 to Method 3, it may be determined that the conversion of the sequence number of the first protocol layer needs to be performed on the first packet.

Similarly, the first access network device may determine, by using any one of Method 1 to Method 3, that conversion of the sequence number of the first protocol layer needs to be performed on the third packet.

In an implementation, the first access network device may determine, based on the following methods, the sequence number that is of the second protocol layer and that corresponds to the data packet of the first service flow.

Method 1: The first access network device substitutes the sequence number of the first protocol layer of the first packet into a preset function by using the sequence number as an input parameter, to determine the sequence number that is of the second protocol layer and that corresponds to the data packet of the first service flow.

Method 2: The first access network device substitutes the sequence number of the first protocol layer of the first packet and a quality of service flow identifier (QFI) into a preset function by using the sequence number and the QFI as input parameters, to determine the sequence number that is of the second protocol layer and that corresponds to the data packet of the first service flow.

For example, the first packet includes the sequence number of the first protocol layer and the data packet of the first service flow, and further includes the QFI. The QFI is used to identify the first service flow; to be specific, the QFI is an identifier of the first service flow.

Similarly, the first access network device may determine, by using Method 1 or Method 2, the sequence number that is of the second protocol layer and that corresponds to the data packet of the first service flow of the third packet.

In an implementation, the first access network device may establish an entity of the second protocol layer. The second protocol layer may be, for example, a packet data convergence protocol (PDCP) layer. The entity of the second protocol layer corresponds to the first service flow, and corresponds only to the first service flow. It may be understood that the entity of the second protocol layer is used to process only a packet of the first service flow. Therefore, if there are N service flows (N is greater than 1), entities of N second protocol layers may be established, and the entity of each second protocol layer is separately configured to process a packet of one of the N service flows, that is, the entities of the N second protocol layers are in a one-to-one correspondence with the N service flows. In a downlink direction, when receiving the first packet and the third packet, the first access network device generates the sequence number of the second protocol layer based on the sequence number of the first protocol layer. In an uplink direction, when receiving the first packet and the third packet, the first access network device generates the sequence number of the second protocol layer based on the sequence number of the first protocol layer.

In another implementation, the first access network device may establish an entity of the second protocol layer. The second protocol layer may be a PDCP layer or a service data adaptation protocol (SDAP) layer. The entity of the second protocol layer corresponds to a plurality of service flows, and the plurality of service flows include the first service flow. In other words, an entity of the second protocol layer may process packets of a plurality (that is, two or more) of service flows, for example, may process the packet of the first service flow, or may process a packet of another service flow. In a downlink direction, both the first packet and the third packet carry the QFI, and the QFI is used to identify that the first packet and the third packet belong to the first service flow. The entity of the second protocol layer of the first access network device determines, based on the sequence number of the first protocol layer of the first packet and the QFI, the sequence number that is of the second protocol layer and that corresponds to the data packet of the first service flow, and determines, based on the sequence number of the first protocol layer of the third packet and the QFI, the sequence number that is of the second protocol layer and that corresponds to the data packet of the first service flow. In an uplink direction, both the first packet and the third packet carry the QFI, and the QFI is used to identify that the first packet and the third packet belong to the first service flow. The first protocol layer is an SDAP layer or a PDCP layer. Correspondingly, the sequence number of the first protocol layer is an SDAP SN or a PDCP SN. When the terminal replicates a packet at the SDAP layer, the first RAN device determines the sequence number of the second protocol layer based on the QFI and the SDAP SN. When the terminal replicates a packet at the PDCP layer, the first RAN device determines the sequence number of the second protocol layer based on the PDCP SN. In an implementation, the plurality of service flows corresponding to the entity of the second protocol layer are all URLLC service flows.

In one implementation, the first service flow in any embodiment is a URLLC service flow.

In one implementation, in the foregoing embodiment, the first access network device receives, through a first channel, the first packet that is from the first device, and receives, through a second channel, the third packet that is from the first device. In addition, the first access network device sends the second packet to the second device through a third channel, and sends the fourth packet to the second device through a fourth channel.

For example, in a case, the first device is a user plane network element, the second device is a terminal, the first channel and the second channel are two independent core network tunnels between the first access network device and the user plane network element, and the third channel and the fourth channel are two independent radio channels between the first access network device and the terminal.

In another case, the first device is a user plane network element, the second device is a terminal, the first channel and the second channel are two independent core network tunnels between the first access network device and the user plane network element, the third channel is a radio channel between the first access network device and the terminal, the fourth channel is a radio channel among the first access network device, a second access network device, and the terminal, the first access network device is a master access network device, and the second access network device is a secondary access network device.

In another case, the first device is a terminal, the second device is a user plane network element, the first channel and the second channel are two independent radio channels between the first access network device and the terminal, and the third channel and the fourth channel are two independent core network tunnels between the first access network device and the user plane network element.

In another case, the first device is a terminal, the second device is a user plane network element, the first channel is a radio channel between the first access network device and the terminal, the second channel is a radio channel among the first access network device, a second access network device, and the terminal, the third channel and the fourth channel are two independent core network tunnels between the first access network device and the user plane network element, the first access network device is a master access network device, and the second access network device is a secondary access network device.

In a possible implementation, the first device is a terminal, the second device is a user plane network element, the first protocol layer is a PDCP layer or an SDAP layer, and the second protocol layer is a general packet radio service technology tunneling protocol-user plane (GTP-U) layer or a high reliability protocol (HRP) layer.

In another possible implementation, the first device is a user plane network element, the second device is a terminal, the first protocol layer is a GTP-U layer or an HRP layer, and the second protocol layer is a PDCP layer or an SDAP layer.

According to a second aspect, this application provides an apparatus. The apparatus may be an access network device, for example, the first access network device in the first aspect, or may be a chip. The apparatus has a function of implementing the first aspect or any embodiment in the first aspect. The function may be implemented by hardware, or may be implemented by hardware by executing corresponding software. The hardware or the software includes one or more modules corresponding to the foregoing function.

According to a third aspect, an apparatus is provided, including a processor and a memory. The memory is configured to store a computer executable instruction. When the apparatus runs, the processor executes the computer executable instruction stored in the memory, so that the apparatus performs the packet transmission method according to any one of the first aspect or the embodiments of the first aspect.

According to a fourth aspect, this application further provides a computer-readable storage medium. The computer-readable storage medium stores an instruction; and when the instruction is run on a computer, the computer is enabled to perform the method according to any one of the first aspect or the embodiments of the first aspect.

According to a fifth aspect, this application further provides a computer program product including an instruction. When the computer program product runs on a computer, the computer is enabled to perform the method according to any one of the first aspect or the embodiments of the first aspect.

According to a sixth aspect, this application further provides a system. The system includes the first access network device in any one of the foregoing aspects. Further, the system may include the first device and the second device in any one of the foregoing aspects. Further, the system may include the second access network device in any one of the foregoing aspects.

Such aspects or other aspects of this application are clearer and more comprehensible in descriptions of the following embodiments.

BRIEF DESCRIPTION OF DRAWINGS

FIG. 8(*b*) is another schematic diagram of packet transmission according to this application;

DESCRIPTION OF EMBODIMENTS

To make the objectives, technical solutions, and advantages of various embodiments clearer, the following further describes in detail with reference to the accompanying drawings. A specific operation method in method embodiments may also be used in an apparatus embodiment or a system embodiment. In the descriptions of this application, unless otherwise stated, "a plurality of" means two or more than two.

Figure 1:
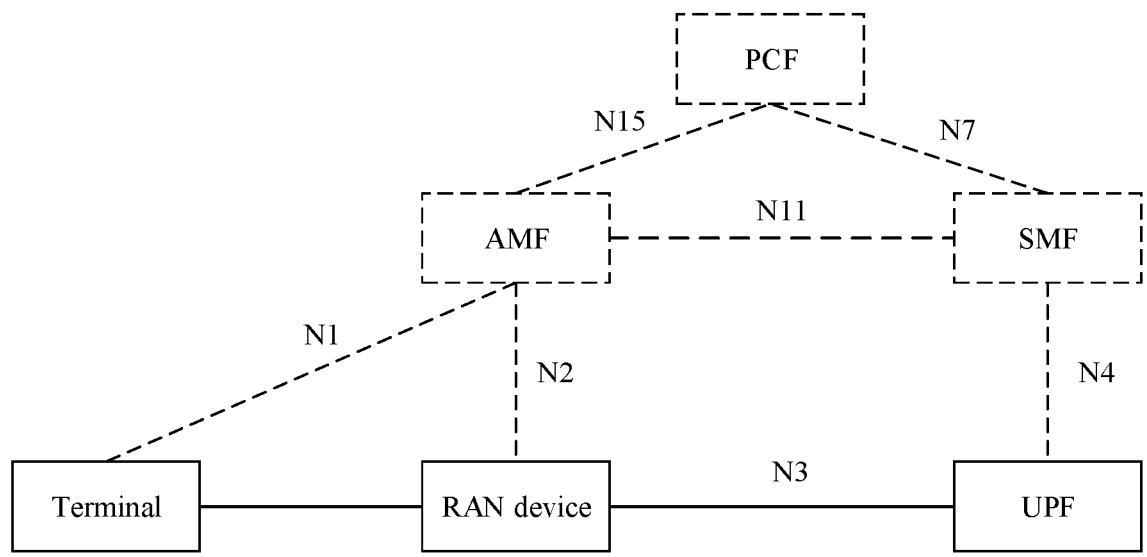
FIG. 1 is a schematic diagram of a possible network architecture according to this application.

FIG. 1 is an example network architecture to which this application is applicable. The network architecture includes an access network device (an example in which the access network device is a radio access network (RAN) device is used in the figure) and a user plane network element (an example in which the user plane network element is a user plane function (UPF) network element is used in the figure). Further, the network architecture may include a terminal. Further, the network architecture may include a mobility management network element (an example in which the mobility management network element is an access and mobility management function (AMF) network element is used in the figure), a session management network element (an example in which the session management network element is a session management function (SMF) network element is used in the figure), a policy control network element (an example in which the policy control network element is a policy control function (PCF) network element is used in the figure), and the like. An interface between the terminal and the AMF network element may be referred to as an N1 interface, an interface between the AMF network element and the RAN device may be referred to as an N2 interface, an interface between the RAN device and the UPF network element may be referred to as an N3 interface, an interface between the SMF network element and the UPF network element may be referred to as an N4 interface, an interface between the SMF network element and the PCF network element may be referred to as an N7 interface, an interface between the AMF network element and the SMF network element may be referred to as an N11 interface, and an interface between the AMF network element and the PCF network element may be referred to as an N15 interface. It is clear that, with evolution of a communications standard, names of the foregoing network elements may change, and names of the interfaces between the network elements may also change.

The user plane network element is mainly responsible for processing a user packet, for example, forwarding, charging, and lawful interception. In 5G communication, the user plane network element may be the UPF network element shown in FIG. 1. In future communication such as 6th generation (6G) communication, the user plane network element may still be a UPF network element, or may have another name. This is not limited in this application.

The access network device is a device that provides a wireless communication function for the terminal. For example, the access network device includes but is not limited to: a next generation NodeB (gNB) in 5G, an evolved NodeB (eNB), a radio network controller (RNC), a NodeB (NB), a base station controller (BSC), a base transceiver station (base transceiver station, BTS), a home base station (for example, a home evolved nodeB, or a home node B, HNB), a baseband unit (BBU), a transmission reception point (TRP), a transmission point (TP), a mobile switching center, and the like.

The terminal in this application is a device that has a wireless transceiver function, and the terminal may be deployed on the land, including an indoor or outdoor device, a hand-held device, or a vehicle-mounted device, or may be deployed on the water (for example, on a ship), or may be deployed in the air (for example, on a plane, a balloon, or a satellite). The terminal may be a mobile phone, a tablet (pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like.

The session management network element is mainly configured to perform session management in a mobile network, for example, session establishment, modification, and release. Specific functions include allocating an internet protocol (IP) address by the terminal, selecting a user plane network element that provides a packet forwarding function, and the like. In the 5G communication, the session management network element may be the SMF network element shown in FIG. 1. In the future communication such as the 6G communication, the session management network element may still be an SMF network element, or may have another name. This is not limited in this application.

The policy control network element has a user subscription data management function, a policy control function, a charging policy control function, quality of service (QoS) control, and the like. In the 5G communication, the policy control network element may be the PCF network element shown in FIG. 1. In the future communication such as the 6G communication, the policy control network element may still be a PCF network element, or may have another name. This is not limited in this application.

The mobility management network element is mainly configured for registration, mobility management, and a tracking area update procedure for the terminal in the mobile network. The mobility management network element terminates a non-access stratum (NAS) message, completes registration management, connection management, reachability management, tracking area list (TA list) allocation, mobility management, and the like, and transparently routes a session management (SM) message to the session management network element. In the 5G communication, the mobility management network element may be the AMF network element shown in FIG. 1. In the future communication such as the 6G communication, the mobility management network element may still be an AMF network element, or may have another name. This is not limited in this application.

It may be understood that the foregoing functions may be network elements in a hardware device, software functions running on dedicated hardware, or virtualized functions instantiated on a platform (for example, a cloud platform).

For ease of description, an example in which the user plane network element is a UPF network element and the access network device is a RAN device is subsequently used for description in this application. Further, the UPF network element is referred to as a UPF for short, and the RAN device is referred to as a RAN for short. In other words, in subsequent descriptions in this application, the UPF may be replaced with a user plane network element, and the RAN may be replaced with an access network device.

Based on the network architecture shown in FIG. 1, in an application scenario, the terminal may be connected to one RAN device. In another application scenario (that is, a dual connectivity (Dual Connectivity, DC) scenario), the terminal may further be connected to two RAN devices at the same time. One RAN device may be referred to as a master RAN (M-RAN) device, and the other RAN device may be referred to as a secondary RAN (S-RAN) device.

The following describes, based on the network architecture shown in FIG. 1, a packet transmission method provided in this application. By performing the packet transmission method in this application, a packet can be efficiently transmitted with high reliability, and overheads of the RAN device can be reduced.

Figure 2:
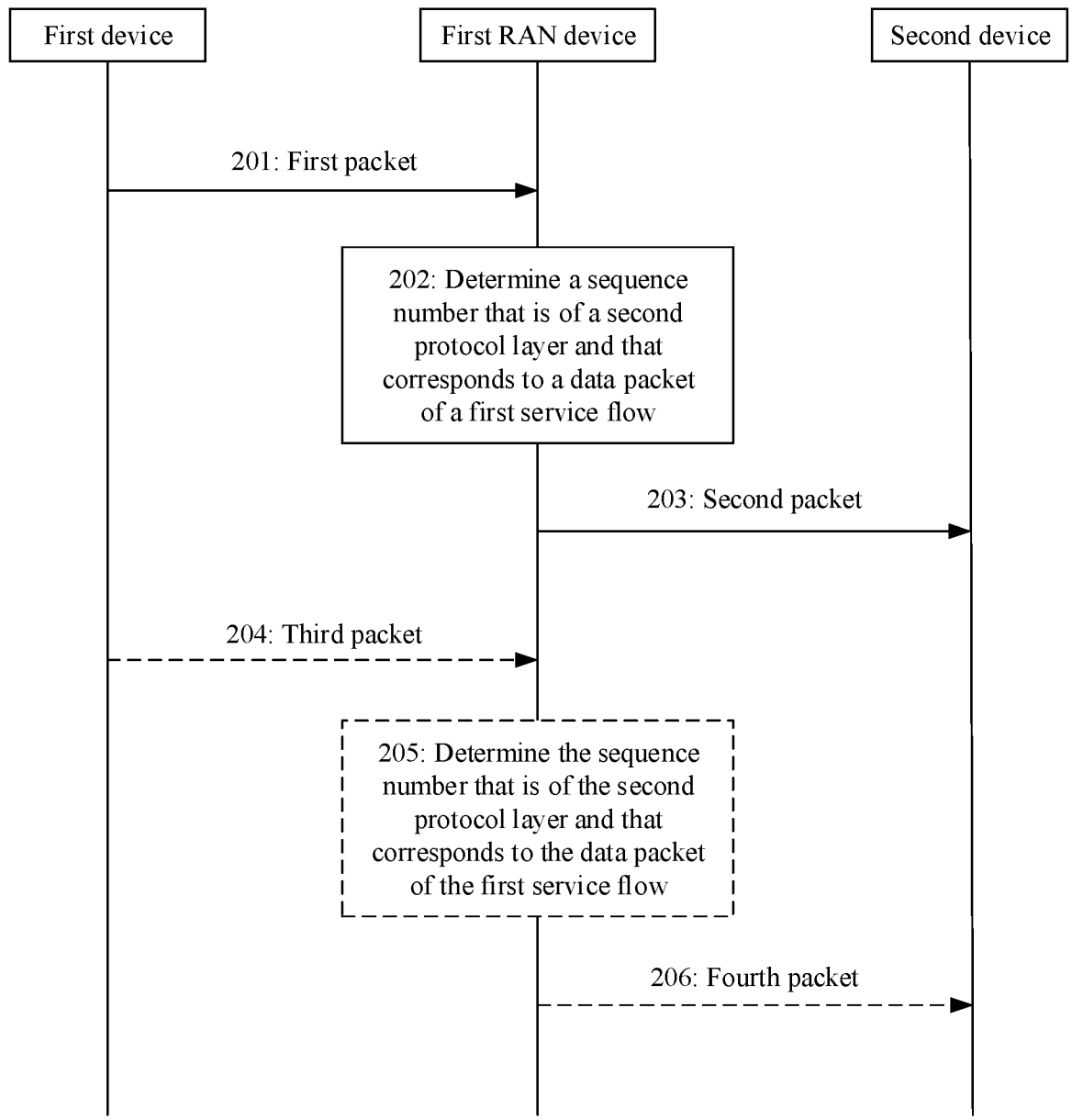
FIG. 2 is a schematic flowchart of a packet transmission method according to this application.

FIG. 2 is a schematic flowchart of a packet transmission method according to this application. A first device is a terminal, and a second device is a UPF. Alternatively, a first device is a UPF, and a second device is a terminal.

The method includes the following steps.

Step 201: The first device sends a first packet to a first RAN device. Correspondingly, the first access network device may receive the first packet.

For a data packet of a first service flow, the first packet sent by the first device to the first RAN device includes the data packet of the first service flow, and the first packet further includes a sequence number of a first protocol layer. The sequence number is a sequence number of the data packet of the first service flow. In other words, the first device generates the sequence number of the first protocol layer at the first protocol layer, and generates the first packet.

The first service flow in this application may be a service flow with a high reliability requirement, or it may be understood that a requirement on transmission reliability of a data packet of a service flow is higher than a preset value. For example, the first service flow may be a URLLC service flow.

Figure 3:
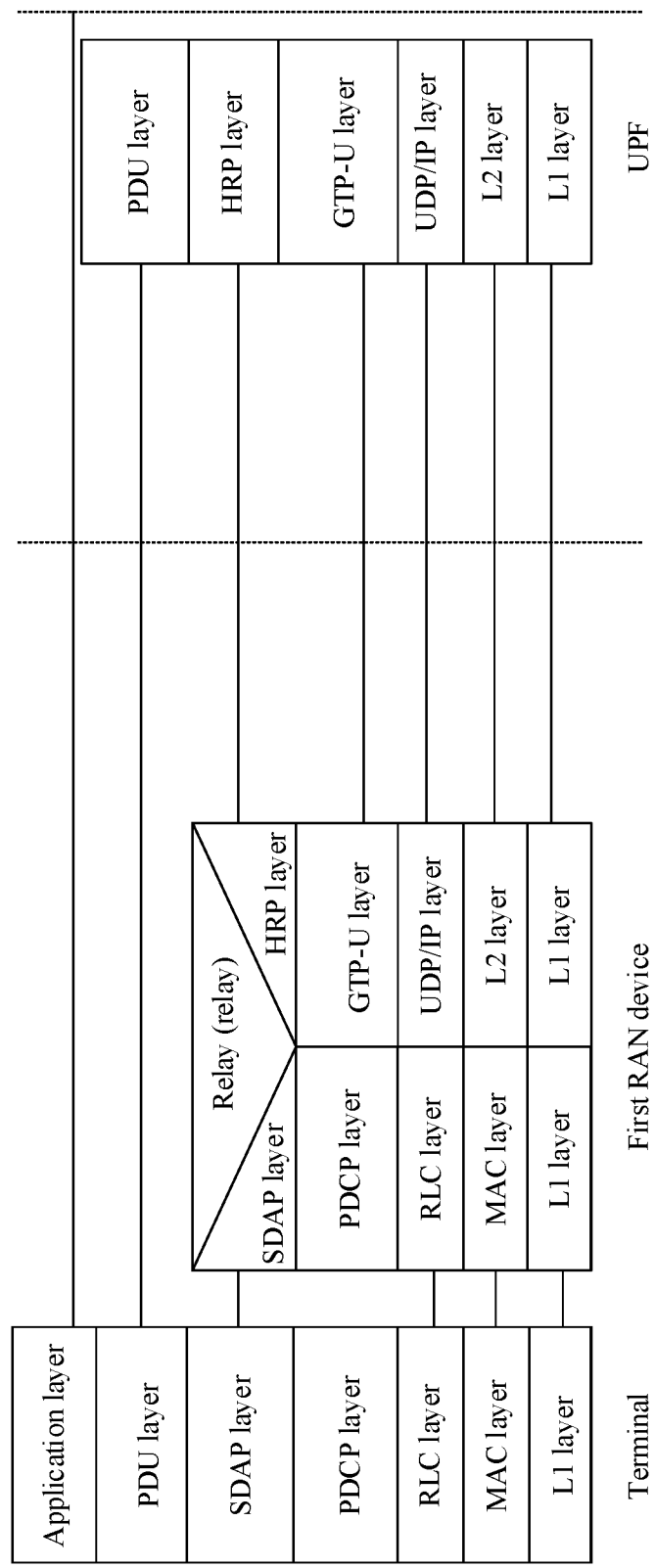
FIG. 3 is an example diagram of protocol layers according to this application.

FIG. 3 is an example diagram of protocol layers according to this application. FIG. 3 is used as an example, the terminal sequentially includes an application layer, a protocol data unit (PDU) layer, an SDAP layer, a PDCP layer, a radio link control (RLC) layer, a media access control (MAC) layer, and an L1 layer. The UPF sequentially includes a PDU layer, an HRP layer, a GTP—U layer, a user datagram protocol (UDP)/IP layer, an L2 layer, and the L1 layer. On a terminal side, the first RAN device sequentially includes an SDAP layer, a PDCP layer, a MAC layer, and an L1 layer. On a UPF side, the first RAN device sequentially includes an HRP layer, a GTP-U layer, a UDP/IP layer, an L2 layer, and an L1 layer. The HRP layer is optional.

The PDCP layer may be used to provide a transmission service for a data radio bearer (DRB), and one DRB corresponds to one entity of the PDCP layer (which may also be referred to as a PDCP entity).

The SDAP layer may be used to perform mapping between a QoS flow and the DRB, and one DRB corresponds to one or more QoS flows. The QoS flow is also referred to as a service flow in this application. One entity of the SDAP layer (which may also be referred to as an SDAP entity) corresponds to one PDU session, and one PDU session includes one or more QoS flows.

The GTP-U layer may be used to transmit user data, for example, the data packet of the first service flow, between a radio access network and a core network. One PDU session corresponds to one entity of the GTP-U layer (which may also be referred to as a GTP-U entity).

In an implementation, when the first device is a UPF, and the second device is a terminal, in a downlink direction, after receiving the data packet of the first service flow, the UPF generates the sequence number of the first protocol layer at the first protocol layer, and then sends the first packet to the first RAN device. The first packet includes the sequence number of the first protocol layer and the data packet of the first service flow. The first protocol layer herein may be the HRP layer or the GTP-U layer of the UPF shown in FIG. 3.

In another implementation, when the first device is a terminal, and the second device is a UPF, in an uplink direction, after generating the data packet of the first service flow, the terminal generates the sequence number of the first protocol layer at the first protocol layer, and then sends the first packet to the first RAN device. The first packet includes the sequence number of the first protocol layer and the data packet of the first service flow. The first protocol layer herein may be the SDAP layer or the PDCP layer of the terminal shown in FIG. 3.

Step 202: If the first RAN device determines that conversion of the sequence number of the first protocol layer needs to be performed on the first packet, the first RAN device determines, based on the sequence number of the first protocol layer of the first packet, a sequence number that is of a second protocol layer and that corresponds to the data packet of the first service flow.

The first RAN device may determine, based on any one of the following methods, that the conversion of the sequence number of the first protocol layer needs to be performed on the first packet.

Method 1: If the first RAN device determines that a redundant transmission path exists between the first RAN device and the second device, the first RAN device determines that the conversion of the sequence number of the first protocol layer needs to be performed on the first packet.

The redundant transmission path means that at least two transmission paths (or referred to as transmission channels or referred to as channels) exist between the first RAN device and the second device.

It should be noted that the redundant transmission path herein and any other redundant transmission path in this application may also be referred to as redundant sessions, or may also be referred to as redundant session paths or redundant paths. Therefore, that the first RAN device determines that a redundant transmission path exists between the first RAN device and the second device may also be understood as the following: The first RAN device determines that a redundant session exists between the first RAN device and the second device, that is, at least two sessions exist.

For example, in a carrier aggregation (CA) mode, at least two channels may exist between the first RAN device and the second device. An example in which two channels exist between the first RAN device and the second device is used. In this application, the two channels between the first RAN device and the second device are respectively referred to as a third channel and a fourth channel. When the first device is a UPF, and the second device is a terminal, the third channel is a radio channel between the first RAN device and the terminal, and the fourth channel is the other radio channel between the first RAN device and the terminal. In other words, the third channel and the fourth channel are two independent radio channels between the first RAN device and the terminal. When the first device is a terminal, and the second device is a UPF, the third channel is a core network tunnel between the first RAN device and the UPF, and the fourth channel is the other core network tunnel between the first RAN device and the UPF. In other words, the third channel and the fourth channel are two independent core network tunnels between the first RAN device and the UPF.

For another example, in a DC mode, the terminal is connected to both the first RAN device and a second RAN device. In the scenario, the first RAN device is also referred to as a master RAN (M-RAN) device, and the second RAN device is also referred to as a secondary RAN (S-RAN) device. Therefore, when the first device is a UPF, and the second device is a terminal, the third channel is a radio channel between the first RAN device and the terminal, and the fourth channel is a radio channel among the first RAN device, the second RAN device, and the terminal. When the first device is a terminal, and the second device is a UPF, the third channel is a core network tunnel between the first RAN device and the UPF, and the fourth channel is the other core network tunnel between the first RAN device and the UPF. In other words, the third channel and the fourth channel are two independent core network tunnels between the first RAN device and the UPF.

Method 2: The first RAN device determines, based on an indication received from a core network control plane, that the conversion of the sequence number of the first protocol layer needs to be performed on the first packet.

For example, an SMF on the core network control plane sends the indication to the first RAN device, and the indication is used to indicate that the conversion of the sequence number of the first protocol layer needs to be performed on the packet of the first service flow. Therefore, when receiving the first packet, the first RAN device determines that the conversion of the sequence number of the first protocol layer needs to be performed on the first packet.

In an implementation, the SMF sends the indication to the first RAN device. The indication includes at least one of a 5G quality of service identifier (5QI), a QFI, single network slice selection assistance information (S-NSSAI), and a data network name (DNN).

For example, the indication includes a 5QI 1, a 5QI 2, and a 5QI 3. In other words, the indication is used to indicate that the conversion of the sequence number of the first protocol layer needs to be performed on packets of service flows identified by the 5QI 1, the 5QI 2, and the 5QI 3. Therefore, when receiving the first packet, the first RAN device may obtain a QFI in the first packet, and then determine a 5QI corresponding to the QFI. If the 5QI is one of the 5QI 1, the 5QI 2, and the 5QI 3, it is determined that the conversion of the sequence number of the first protocol layer needs to be performed on the first packet.

For another example, the indication includes a QFI 1, a QFI 2, and a QFI 3. In other words, the indication is used to indicate that the conversion of the sequence number of the first protocol layer needs to be performed on packets of service flows identified by the QFI 1, the QFI 2, and the QFI 3. Therefore, when receiving the first packet, the first RAN device may obtain a QFI in the first packet. If the QFI is one of the QFI 1, the QFI 2, and the QFI 3, it is determined that the conversion of the sequence number of the first protocol layer needs to be performed on the first packet.

For another example, the indication includes S-NSSAI 1, S-NSSAI 2, and S-NSSAI 3. In other words, the indication is used to indicate that the conversion of the sequence number of the first protocol layer needs to be performed on packets of service flows in slices identified by the S-NSSAI 1, the S-NSSAI 2, and the S-NSSAI 3. Therefore, when receiving the first packet, the first RAN device may determine a session corresponding to the first packet, and then determine, based on a correspondence that is between a session and S-NSSAI and that is stored by the first RAN device, S-NSSAI corresponding to the session. If the S-NSSAI is one of the S-NSSAI 1, the S-NSSAI 2, and the S-NSSAI 3, it is determined that the conversion of the sequence number of the first protocol layer needs to be performed on the first packet.

For another example, the indication includes a DNN 1, a DNN 2, and a DNN 3. In other words, the indication is used to indicate that the conversion of the sequence number of the first protocol layer needs to be performed on packets of service flows in data networks identified by the DNN 1, the DNN 2, and the DNN 3. Therefore, when receiving the first packet, the first RAN device may determine a session corresponding to the first packet, and then determine, based on a correspondence that is between a session and a DNN and that is stored by the first RAN device, a DNN corresponding to the session. If the DNN is one of the DNN 1, the DNN 2, and the DNN 3, it is determined that the conversion of the sequence number of the first protocol layer needs to be performed on the first packet.

In another implementation, the foregoing implementations may be combined to determine whether the conversion of the sequence number of the first protocol layer needs to be performed on the first packet.

Method 3: If the first RAN device determines, based on an indication received from a core network control plane, that a redundant transmission path exists between the first RAN device and the second device, the first RAN device determines that the conversion of the sequence number of the first protocol layer needs to be performed on the first packet.

The method is a combination of Method 1 and Method 2. It needs to be determined, based on the indication of the core network control plane, that the redundant transmission path exists between the first RAN device and the second device, and then it is determined that the conversion of the sequence number of the first protocol layer needs to be performed on the first packet.

Method 4: The first RAN device determines, based on pre-configured information, that the conversion of the sequence number of the first protocol layer needs to be performed on the first packet. Configured information includes at least one of a 5QI, a QFI, S-NSSAI, and a DNN of a packet that is of a service flow and on which the conversion of the sequence number of the first protocol layer needs to be performed.

For example, a 5QI 1, a 5QI 2, and a 5QI 3 are pre-configured on the first RAN device, to indicate that the conversion of the sequence number of the first protocol layer needs to be performed on packets of service flows identified by the 5QI 1, the 5QI 2, and the 5QI 3. Therefore, when receiving the first packet, the first RAN device may obtain a QFI in the first packet, and then determine a 5QI corresponding to the QFI. If the 5QI is one of the 5QI 1, the 5QI 2, and the 5QI 3, it is determined that the conversion of the sequence number of the first protocol layer needs to be performed on the first packet.

For another example, a QFI 1, a QFI 2, and a QFI 3 are pre-configured on the first RAN device, to indicate that the conversion of the sequence number of the first protocol layer needs to be performed on packets of service flows identified by the QFI 1, the QFI 2, and the QFI 3. Therefore, when receiving the first packet, the first RAN device may obtain a QFI in the first packet. If the QFI is one of the QFI 1, the QFI 2, and the QFI 3, it is determined that the conversion of the sequence number of the first protocol layer needs to be performed on the first packet.

For another example, S-NSSAI 1, S-NSSAI 2, and S-NSSAI 3 are pre-configured on the first RAN device, to indicate that the conversion of the sequence number of the first protocol layer needs to be performed on packets of service flows in slices identified by the S-NSSAI 1, the S-NSSAI 2, and the S-NSSAI 3. Therefore, when receiving the first packet, the first RAN device may determine a session corresponding to the first packet, and then determine, based on a correspondence that is between a session and S-NSSAI and that is stored by the first RAN device, S-NSSAI corresponding to the session. If the S-NSSAI is one of the S-NSSAI 1, the S-NSSAI 2, and the S-NSSAI 3, it is determined that the conversion of the sequence number of the first protocol layer needs to be performed on the first packet.

For another example, a DNN 1, a DNN 2, and a DNN 3 are pre-configured on the first RAN device, to indicate that the conversion of the sequence number of the first protocol layer needs to be performed on packets of service flows in data networks identified by the DNN 1, the DNN 2, and the DNN 3. Therefore, when receiving the first packet, the first RAN device may determine a session corresponding to the first packet, and then determine, based on a correspondence that is between a session and a DNN and that is stored by the first RAN device, a DNN corresponding to the session. If the DNN is one of the DNN 1, the DNN 2, and the DNN 3, it is determined that the conversion of the sequence number of the first protocol layer needs to be performed on the first packet.

In another implementation, the foregoing implementations may be combined to determine whether the conversion of the sequence number of the first protocol layer needs to be performed on the first packet.

According to any one of Method 1 to Method 4, it may be determined that the conversion of the sequence number of the first protocol layer needs to be performed on the first packet.

After determining that the conversion of the sequence number of the first protocol layer needs to be performed on the first packet, the first RAN device determines, based on the sequence number of the first protocol layer of the first packet, the sequence number that is of the second protocol layer and that corresponds to the data packet of the first service flow in the first packet. The following separately provides descriptions with reference to different cases.

Case 1: The first device is a UPF, and the second device is a terminal.

Referring to FIG. 3, if the first device is a UPF, the first protocol layer is an HRP layer or a GTP-U layer. In other words, when the first protocol layer is an HRP layer, the first packet sent by the UPF to the first RAN device includes an HRP SN, the data packet of the first service flow, and the QFI; or when the first protocol layer is a GTP-U layer, the first packet includes a GTP-U SN, the data packet of the first service flow, and the QFI. The SN herein is short for a sequence number. The QFI in the first packet is used to identify that the data packet is of the first service flow.

In the following, for example, if the first protocol layer is a GTP-U layer, a GTP-U entity of the UPF generates the GTP-U SN, and then generates the first packet. Then, the UPF sends the first packet to the first RAN device.

After receiving the first packet, the first RAN device obtains the GTP-U SN in the first packet, and generates the sequence number of the second protocol layer based on the GTP-U SN. The sequence number of the second protocol layer herein may be, for example, a PDCP SN or an SDAP SN. For example, if the sequence number of the second protocol layer is the PDCP SN, the PDCP SN may be generated by using the following methods.

Method 1: A GTP-U entity of the first RAN device generates a first sequence number based on the GTP-U SN of the first packet, and a PDCP entity of the first RAN device uses the first sequence number as the PDCP SN.

For example, the GTP-U entity of the first RAN device may use the GTP-U SN as the first sequence number. For example, when the UPF extends a GTP-U header to add a new SN information element, to be specific, includes the GTP-U SN in the new SN information element, the GTP-U SN carried in the new SN information element may be added in a PDCP SN format. Therefore, after receiving the GTP-U header, the first RAN device may use the GTP-U SN in the new information element of the GTP-U header as the first sequence number. In this implementation, the UPF has a part of functions of a part of PDCP entities. In other words, the UPF generates the PDCP SN, and encapsulates the PDCP SN in the GTP-U header by using the PDCP SN as an information element.

For another example, the GTP-U entity of the first RAN device may further substitute the GTP-U SN and the QFI into a preset function by using the GTP-U SN and the QFI as input parameters, to obtain the first sequence number, that is, the first sequence number=f(GTP-U SN, QFI), where f represents a function mapping relationship, and may be, for example, a hash function. The substituting into the preset function may also be described as a rule, for example, a rule pre-configured on the first RAN device. For example, in an example, when the UPF reuses an SN information element in an existing GTP-U header, in other words, the SN information element in the existing GTP-U header carries the GTP-U SN, the GTP-U entity of the first RAN device may obtain the first sequence number based on the GTP-U SN and the QFI that are in the GTP-U header.

Then, the PDCP entity of the first RAN device uses the first sequence number as the PDCP SN.

In the method, the GTP-U entity generates the first sequence number, and then the PDCP entity uses the first sequence number as the PDCP SN.

Method 2: A PDCP entity of the first RAN device generates the PDCP SN based on the GTP-U SN of the first packet.

For example, the PDCP entity of the first RAN device may use the GTP-U SN as the PDCP SN. For example, when the UPF extends a GTP-U header to add a new SN information element, to be specific, includes the GTP-U SN in the new SN information element, the GTP-U SN carried in the new SN information element may be added in a PDCP SN format. Therefore, after the first RAN device receives the GTP-U header, the PDCP entity may use the GTP-U SN in the new information element of the GTP-U header as the PDCP SN. In this implementation, the GTP-U entity of the UPF has a part of functions of a part of PDCP entities. In other words, the UPF generates the PDCP SN, and encapsulates the PDCP SN in the GTP-U header by using the PDCP SN as an information element.

For another example, the PDCP entity of the first RAN device may further substitute the GTP-U SN and the QFI into a preset function by using the GTP-U SN and the QFI as input parameters, to obtain the first sequence number, that is, the first sequence number=f(GTP-U SN, QFI), where f represents a function mapping relationship, and may be, for example, a hash function. For example, in an example, when the UPF reuses an SN information element in an existing GTP-U header, in other words, the SN information element in the existing GTP-U header carries the GTP-U SN, the PDCP entity of the first RAN device may obtain the PDCP SN based on the GTP-U SN and the QFI that are in the GTP-U header.

In the method, the PDCP entity of the first RAN device determines the PDCP SN.

Similarly, if the first protocol layer is an HRP layer, and the second protocol layer is a PDCP layer, the PDCP entity of the first RAN device may obtain the PDCP SN according to a method similar to Method 1 or Method 2.

Similarly, if the first protocol layer is a GTP-U layer, and the second protocol layer is an SDAP layer, an SDAP entity of the first RAN device may obtain the SDAP SN according to a method similar to Method 1 or Method 2.

Similarly, if the first protocol layer is an HRP layer, and the second protocol layer is an SDAP layer, the SDAP entity of the first RAN device may obtain the SDAP SN according to a method similar to Method 1 or Method 2.

Case 2: The first device is a terminal, and the second device is a UPF.

Referring to FIG. 3, if the first device is a terminal, the first protocol layer is an SDAP layer or a PDCP layer. In other words, when the first protocol layer is an SDAP layer, the first packet sent by the terminal to the first RAN device includes an SDAP SN and the data packet that is of the first service flow; or when the first protocol layer is a PDCP layer, the first packet includes a PDCP SN and the data packet that is of the first service flow. Optionally, the first packet further includes the QFI.

In the following, for example, if the first protocol layer is a PDCP layer, a PDCP entity of the terminal generates the PDCP SN, and then generates the first packet. Then, the terminal sends the first packet to the first RAN device.

After receiving the first packet, the first RAN device obtains the PDCP SN in the first packet, and generates the sequence number of the second protocol layer based on the PDCP SN. The sequence number of the second protocol layer herein may be, for example, an HRP SN or a GTP-U SN. For example, if the sequence number of the second protocol layer is the GTP-U SN, the GTP-U SN may be generated by using the following methods.

Method 1: A PDCP entity of the first RAN device generates the first sequence number based on the PDCP SN of the first packet, and a GTP-U entity of the first RAN device uses the first sequence number as the GTP-U SN.

In accordance with the present disclosure, service flows may be classified into a service flow with a high reliability requirement and a service flow without a high reliability requirement. For example, if the service flow with the high reliability requirement is a URLLC service flow, the service flows may be specifically classified into a URLLC service flow and a non-URLLC service flow. The first service flow in this application is a URLLC service flow. In a specific implementation of this application, one PDCP entity may correspond to one URLLC service flow; to be specific, one PDCP entity processes only one URLLC service flow. Alternatively, in another specific implementation of this application, one PDCP entity may correspond to a plurality of URLLC service flows; to be specific, one PDCP entity may process a plurality of service flows, and the plurality of service flows are all URLLC service flows. Alternatively, in still another specific implementation of this application, one PDCP entity corresponds to one or more service flows, and the one or more service flows may include a URLLC service flow, and may also include a non-URLLC service flow. The following separately describes the foregoing different implementations with reference to specific illustrations. In the following implementations, an example in which there are five service flows in a session established by the terminal through a session establishment procedure is used for description. Identifiers corresponding to the service flows are a QFI 1 to a QFI 5, service flows identified by the QFI 1, the QFI 2, and the QFI 4 are URLLC service flows, and service flows identified by the QFI 3 and the QFI 5 are non-URLLC service flows.

(1) One PDCP corresponds to a plurality of service flows, and the plurality of service flows may include a URLLC service flow, and may also include a non-URLLC service flow.

Figure 4:
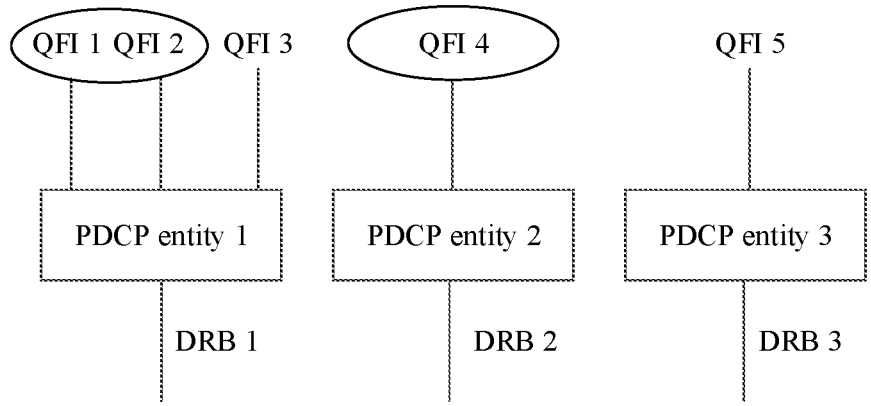
FIG. 4 is a schematic diagram of a correspondence between a PDCP entity and a service flow according to this application.

FIG. 4 is a schematic diagram of a correspondence between a PDCP entity and a service flow according to this application. The first RAN device establishes one PDCP entity for the service flows identified by the QFI 1, the QFI 2, and the QFI 3, establishes one PDCP entity for the service flow identified by the QFI 4, and establishes one PDCP entity for the service flow identified by the QFI 5. In addition, each PDCP entity corresponds to one DRB, and the DRBs are respectively a DRB 1, a DRB 2, and a DRB 3.

In the example, a type of a service flow processed by the PDCP entity is not limited. For example, a PDCP entity 1 may process a URLLC service flow, and may also process a non-URLLC service flow. A PDCP entity 2 processes only a URLLC service flow, and a PDCP entity 3 processes only a non-URLLC service flow.

(2) One PDCP entity corresponds to a plurality of URLLC service flows.

Figure 5:
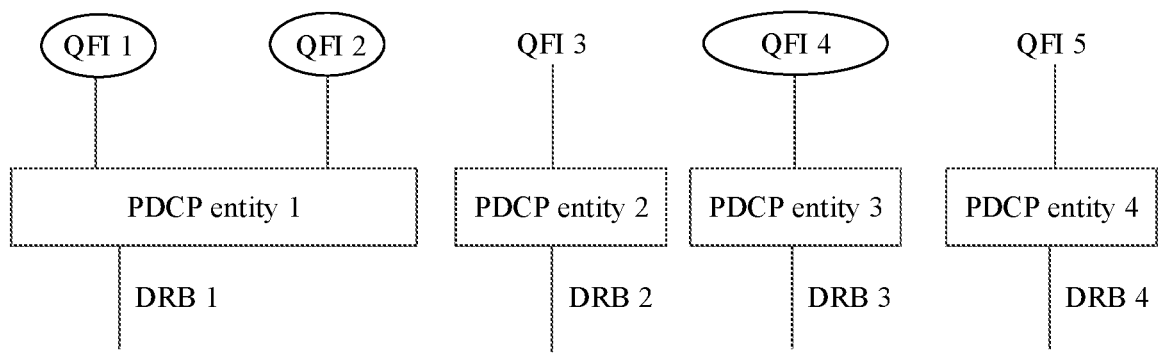
FIG. 5 is another schematic diagram of a correspondence between a PDCP entity and a service flow according to this application.

FIG. 5 is another schematic diagram of a correspondence between a PDCP entity and a service flow according to this application. The first RAN device establishes one PDCP entity for the service flows identified by the QFI 1 and the QFI 2, establishes one PDCP entity for the service flow identified by the QFI 3, establishes one PDCP entity for the service flow identified by the QFI 4, and establishes one PDCP entity for the service flow identified by the QFI 5. In addition, each PDCP entity corresponds to one DRB, and the DRBs are respectively a DRB 1, a DRB 2, a DRB 3, and a DRB 4.

In the example, a type of a service flow processed by the PDCP entity is limited. Specifically, one PDCP entity processes only one or more URLLC service flows, or processes only one or more non-URLLC service flows. For example, a PDCP entity 1 and a PDCP entity 3 process only a URLLC service flow, and a PDCP entity 2 and a PDCP entity 4 process only a non-URLLC service flow.

(3) One PDCP entity corresponds to one URLLC service flows.

Figure 6:
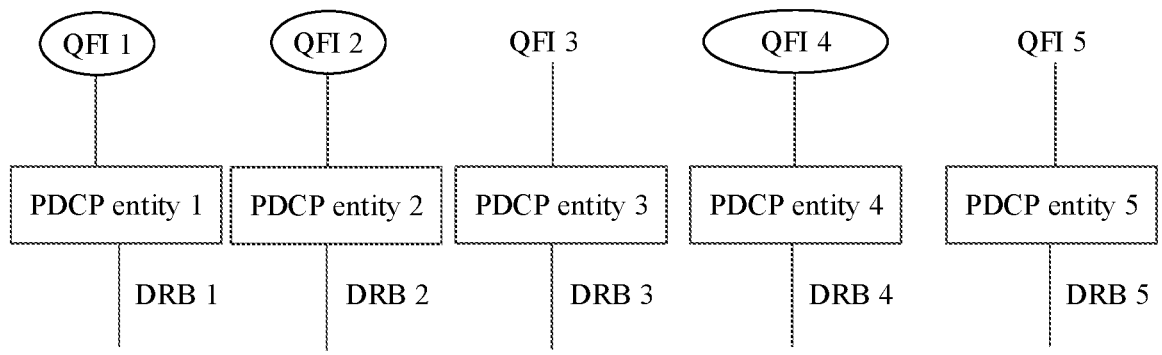
FIG. 6 is another schematic diagram of a correspondence between a PDCP entity and a service flow according to this application.

FIG. 6 is another schematic diagram of a correspondence between a PDCP entity and a service flow according to this application. The first RAN device establishes one PDCP entity for each of the service flows identified by the QFI 1 to the QFI 5. In addition, each PDCP entity corresponds to one DRB, and the DRBs are respectively a DRB 1, a DRB 2, a DRB 3, a DRB 4, and a DRB 5.

In the example, a type of a service flow processed by the PDCP entity is limited. Specifically, one PDCP entity processes only one URLLC service flow, or processes only one or more non-URLLC service flows. For example, each of a PDCP entity 1, a PDCP entity 2, and a PDCP entity 4 processes only one URLLC service flow, and a PDCP entity 3 and a PDCP entity 5 process only a non-URLLC service flow.

It should be noted that, for the URLLC service flow, if one PDCP entity processes one URLLC service flow, the first packet sent by the terminal to the first RAN device may not carry a QFI used to identify a service flow. Specifically, the terminal sends the first packet to the first RAN device by using a DRB, and the first packet includes the data packet of the first service flow and the PDCP SN. After receiving the first packet by using the DRB, the first RAN device may determine a corresponding PDCP entity based on the DRB used for receiving the first packet, and the PDCP entity may learn of a unique corresponding QFI; or the first RAN device may determine, based on the DRB used for receiving the first packet and a correspondence between a DRB and a QFI, a QFI corresponding to the first packet.

For example, in an implementation, based on any one of the examples shown in FIG. 4 to FIG. 6, the PDCP entity of the first RAN device may use the PDCP SN of the first packet as the first sequence number.

For another example, in another implementation, based on the example shown in FIG. 4 or FIG. 5, because the first packet includes the QFI, the PDCP entity of the first RAN device may further substitute the PDCP SN and the QFI into a preset function by using the PDCP SN and the QFI as input parameters, to obtain the first sequence number, that is, the first sequence number=f(PDCP SN, QFI), where f represents a function mapping relationship, and may be, for example, a hash function.

For another example, in another implementation, based on the example shown in FIG. 6, because the first packet may not carry the QFI, the PDCP entity of the first RAN device may further substitute the PDCP SN into a preset function by using the PDCP SN as an input parameter, to obtain the first sequence number, that is, the first sequence number=f(PDCP SN). In this case, the obtained first sequence number may be the same as or different from the PDCP SN. Correspondingly, in the downlink direction, when the first RAN device sends a packet to the terminal, a QFI may not be carried in the packet. Optionally, if the first RAN device establishes an independent PDCP entity for each URLLC service flow, when the first RAN device or the terminal performs packet encapsulation, an SDAP header (the SDAP header is used to carry a QFI and perform mapping between the QFI and a DRB) does not need to be carried. In this way, air interface transmission resources can be saved, and air interface transmission efficiency is improved.

In the method, the PDCP entity of the first RAN device generates the first sequence number, and then the GTP-U entity of the first RAN device uses the first sequence number as the GTP-U SN.

Method 2: A GTP-U entity of the first RAN device generates the GTP-U SN based on the PDCP SN of the first packet.

For example, the GTP-U entity of the first RAN device may use the PDCP SN as the GTP-U SN. For another example, the GTP-U entity of the first RAN device may further substitute the PDCP SN into a preset function by using the PDCP SN as an input parameter, to obtain the GTP-U SN, that is, the GTP-U SN=f(PDCP SN). In this case, the obtained GTP-U SN may be the same as or different from the PDCP SN, where f represents a function mapping relationship, and may be, for example, a hash function. For another example, if the first packet further includes the QFI, the GTP-U entity of the first RAN device may further substitute the PDCP SN and the QFI into a preset function by using the PDCP SN and the QFI as input parameters, to obtain the first sequence number, that is, the first sequence number=f(PDCP SN, QFI).

In the method, the GTP-U entity of the first RAN device generates the GTP-U SN.

Similarly, if the first protocol layer is an SDAP layer, and the second protocol layer is a GTP-U layer, the GTP-U entity of the first RAN device may obtain the GTP-U SN according to a method similar to Method 1 or Method 2.

Similarly, if the first protocol layer is a PDCP layer, and the second protocol layer is an HRP layer, the HRP entity of the first RAN device may obtain the HRP SN according to a method similar to Method 1 or Method 2.

Similarly, if the first protocol layer is an SDAP layer, and the second protocol layer is an HRP layer, the HRP entity of the first RAN device may obtain the HRP SN according to a method similar to Method 1 or Method 2.

Through step 202, the first RAN device may obtain, based on the sequence number of the first protocol layer of the first packet, the sequence number that is of the second protocol layer and that corresponds to the data packet of the first service flow of the first packet, and then perform encapsulation at the second protocol layer based on the data packet of the first service flow and the sequence number of the second protocol layer, to obtain the second packet.

Step 203: The first RAN device sends the second packet to the second device. Correspondingly, the second device may receive the second packet.

The second packet includes the sequence number of the second protocol layer and the data packet of the first service flow.

In the foregoing embodiment, the first device supports the first protocol layer, and the first device replicates a packet at the first protocol layer. The second device supports the second protocol layer, and the second device deduplicates the packet at the second protocol layer. Therefore, when receiving the first packet, the first access device converts the sequence number of the first protocol layer in the first packet into the sequence number of the second protocol layer, and then sends, to the second device, the second packet that carries the sequence number of the second protocol layer and the data packet of the first packet. For example, if the first RAN device receives two packets having same data packets, the first RAN device separately coverts sequence numbers in the two packets without performing operations of first deduplicating and then replicating the packet. Therefore, overheads of the first RAN device can be reduced.

Further, with reference to the foregoing step 201 to step 203, the method may further include the following step 204 to step 206.

Step 204: The first device sends a third packet to the first RAN device. Correspondingly, the first access network device may receive the third packet.

The third packet includes a sequence number of the first protocol layer and a data packet of the first service flow. In addition, the sequence number that is of the first protocol layer and that is included in the third packet is the same as the sequence number that is of the first protocol layer and that is included in the first packet, and the data packet that is of the first service flow and that is included in the third packet is the same as the data packet that is of the first service flow and that is included in the first packet. It may be understood that the third packet is obtained by replicating the first packet.

Because the third packet and the first packet each include the same data packet of the first service flow, the first device actually transmits two copies of the data packet of the first service flow to the second device, thereby helping ensure high reliability of a service.

Step 205: If the first RAN device determines that conversion of the sequence number of the first protocol layer needs to be performed on the third packet, the first RAN device determines, based on the sequence number of the first protocol layer of the third packet, the sequence number that is of the second protocol layer and that corresponds to the data packet of the first service flow.

Step 205 is similar to the method in which the first RAN device determines the sequence number that is of the second protocol layer and that corresponds to the data packet of the first service flow in step 202. Therefore, the sequence number that is of the second protocol layer and that is determined by the first RAN device in step 205 is the same as the sequence number that is of the second protocol layer and that is determined by the first RAN device in step 202. For details, refer to the foregoing descriptions. Details are not described herein again.

Step 206: The first RAN device sends a fourth packet to the second device. Correspondingly, the second device may receive the fourth packet.

The fourth packet includes a sequence number of the second protocol layer and a data packet of the first service flow. The sequence number that is of the second protocol layer and that is included in the fourth packet is the same as the sequence number that is of the second protocol layer and that is included in the second packet, and a data packet that is of a second service flow and that is included in the fourth packet is the same as a data packet that is of the second service flow and that is included in the second packet.

It should be noted that a time sequence between any one of the foregoing step 204 to step 206 and any one of the foregoing step 201 to step 203 is not strictly limited.

Through the foregoing step 201 to step 206, when receiving the first packet and the third packet that each carry the same data packet of the first service flow and the same sequence number of the first protocol layer, the first access network device does not need to deduplicate the first packet and the third packet, but converts the sequence number of the first protocol layer of the first packet to obtain the sequence number of the second protocol layer and converts the sequence number of the first protocol layer of the third packet to obtain the sequence number of the second protocol layer, respectively, and separately sends, to the terminal, the second packet and the fourth packet that each carry the data packet of the first service flow and the sequence number of the second protocol layer. In this way, the overheads of the first access network device can be reduced. In addition, after receiving the second packet and the fourth packet, the second device performs deduplication processing to obtain the data packet of the first service flow, so as to transmit the service with high reliability.

In an alternative implementation, the foregoing step 204 to step 206 may further be replaced with the following step A to step D.

Step A: The first RAN device records a correspondence between the sequence number of the first protocol layer of the first packet and the sequence number that is of the second protocol layer and that corresponds to the data packet of the first service flow.

Step A is performed after step 202. Because the sequence number that is of the second protocol layer and that corresponds to the data packet of the first service flow is already obtained in step 202, the first RAN device may record the correspondence between the sequence number of the first protocol layer of the first packet and the sequence number that is of the second protocol layer and that corresponds to the data packet of the first service flow. For example, the first device is a UPF, the second device is a terminal, the first protocol layer is a GTP-U layer, and the second protocol layer is a PDCP layer. If the sequence number of the first protocol layer is a GTP-U SN 1, and the obtained sequence number of the second protocol layer is a PDCP SN 1, a correspondence between the GTP-U SN 1 and the PDCP SN 1 may be recorded. Optionally, the first RAN device may further record a correspondence among the GTP-U SN 1, the QFI, and the PDCP SN 1.

Step B: The first device sends a third packet to the first RAN device. Correspondingly, the first RAN device may receive the third packet.

The third packet includes a sequence number of the first protocol layer and the data packet of the first service flow. The sequence number that is of the first protocol layer and that is included in the first packet is the same as the sequence number that is of the first protocol layer and that is included in the third packet.

Step C: If the first RAN device determines that conversion of the sequence number of the first protocol layer needs to be performed on the third packet, the first RAN device determines, based on the correspondence and the sequence number that is of the first protocol layer of the third packet, the sequence number that is of the second protocol layer and that corresponds to the data packet of the first service flow.

In some embodiments, in an alternative implementation of step C, if the correspondence recorded by the first RAN device is a correspondence among the sequence number of the first protocol layer, the sequence number of the second protocol layer, and the QFI, the first RAN device may determine, based on the correspondence, the sequence number of the first protocol layer, and the QFI, the sequence number that is of the second protocol layer and that corresponds to the data packet of the first service flow.

If the foregoing example is used as an example, the sequence number that is of the first protocol layer and that is included in the third packet is the GTP-U SN 1. Therefore, the first RAN device determines, based on the correspondence and the GTP-U SN 1 in the third packet, that the sequence number that is of the second protocol layer and that corresponds to the data packet of the first service flow in the third packet is the PDCP SN 1.

Step D: The first RAN device sends a fourth packet to the second device. Correspondingly, the second device may receive the fourth packet.

The fourth packet includes a sequence number of the second protocol layer and a data packet of the first service flow. The sequence number that is of the second protocol layer and that is included in the fourth packet is the same as the sequence number that is of the second protocol layer and that is included in the second packet, and the data packet that is of the first service flow and that is included in the fourth packet is the same as the data packet that is of the first service flow and that is included in the second packet.

Figure 7:
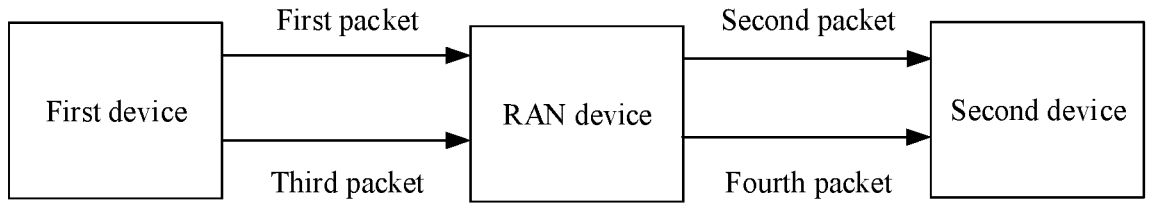
FIG. 7 is a schematic diagram of packet transmission according to this application.
Figure 8A:
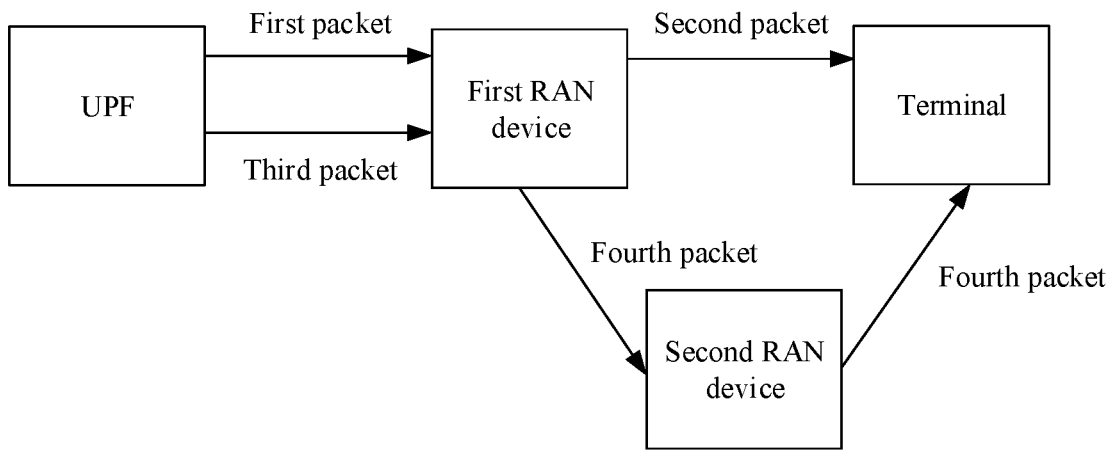
FIG. 8(*a*) is another schematic diagram of packet transmission according to this application.
Figure 8B:
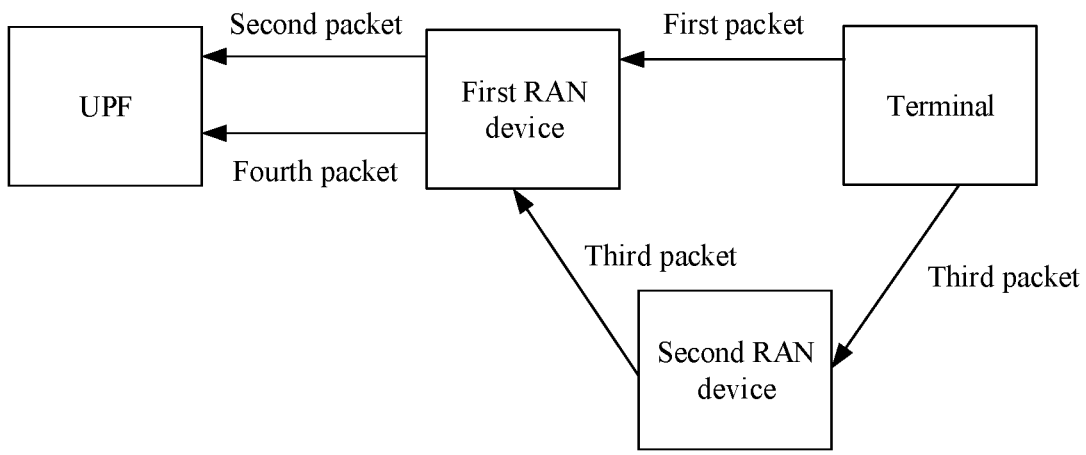

The following specifically describes the embodiment shown in FIG. 2 with reference to application scenarios shown in FIG. 7, FIG. 8(a), and FIG. 8(b).

FIG. 7 is a schematic diagram of packet transmission according to this application. The RAN device shown in the figure may also be referred to as a first RAN device. The RAN device may establish two radio channels (which may also be referred to as channels) with a terminal in a CA manner. In the example, a first device sends a first packet to the RAN device through a first channel and sends a third packet to the RAN device through a second channel. The RAN device obtains a second packet based on the first packet, and obtains a fourth packet based on the third packet. For a specific implementation process, refer to the foregoing embodiment. Then, the RAN device sends the second packet to a second device through a third channel and sends the fourth packet to the second device through a fourth channel.

For example, when the first device is a UPF, and the second device is a terminal, the first channel and the second channel are two independent core network tunnels between the RAN device and the UPF, and the third channel and the fourth channel are two independent radio channels between the RAN device and the terminal.

When the first device is a terminal, and the second device is a UPF, the first channel and the second channel are two independent radio channels between the first RAN device and the terminal, and the third channel and the fourth channel are two independent core network tunnels between the first RAN device and the UPF.

Based on the example, the first device replicates a data packet of a first service flow and replicates a sequence number of a first protocol layer to obtain the first packet and the third packet, and then respectively sends, through the first channel and the second channel, to the RAN device, the first packet and the third packet that each have the same data packet of the first service flow and the same sequence number of the first protocol layer. The RAN device respectively converts the sequence number that is of the first protocol layer and that is carried in the first packet and the sequence number that is of the first protocol layer and that is carried in the third packet into sequence numbers of a second protocol layer to obtain the second packet and the fourth packet, and then sends, through the third channel and the fourth channel, to the second device, the second packet and the fourth packet that each have the same data packet of the first service flow and the same sequence number of the second protocol layer. The second device deduplicates the second packet and the fourth packet by using an entity of the second protocol layer, to obtain the data packet of the first service flow.

FIG. 8(a) and FIG. 8(b) are other schematic diagrams of packet transmission according to this application. In a DC mode, a terminal can be connected to a first RAN device and a second RAN device at the same time. The first RAN device may also be referred to as an M-RAN device, and the second RAN device may also be referred to as an S-RAN device. In the example, in a downlink direction, referring to FIG. 8(a), a UPF sends a first packet to the first RAN device through a first channel and sends a third packet to the first RAN device through a second channel. In an uplink direction, referring to FIG. 8 (b), the terminal sends the first packet to the first RAN device through the first channel, and the terminal sends the third packet to the first RAN device through the second channel. It may be understood that, the terminal sends the third packet to the second RAN device, and then the second RAN device forwards the third packet to the first RAN device, that is, the terminal sends the third packet to the first RAN device through the second RAN device. The first RAN device obtains a second packet based on the first packet, and obtains a fourth packet based on the third packet. For an example implementation process, refer to the foregoing embodiment. Then, the first RAN device sends the second packet to a second device through a third channel and sends the fourth packet to the second device through a fourth channel.

For example, in the downlink direction, referring to FIG. 8(a), when the first device is a UPF, and the second device is a terminal, the first channel and the second channel are two independent core network tunnels between the first RAN device and the UPF, the third channel is a radio channel between the first RAN device and the terminal, and the fourth channel is a radio channel among the first RAN device, the second RAN device, and the terminal. In the uplink direction, referring to FIG. 8(b), when the first device is a terminal, and the second device is a UPF, the first channel is a radio channel between the first RAN device and the terminal, the second channel is a radio channel among the terminal, the second RAN device, and the first RAN device, and the third channel and the fourth channel are two independent core network tunnels between the first RAN device and the UPF.

Based on the example, the first device replicates a data packet of a first service flow and replicates a sequence number of a first protocol layer to obtain the first packet and the third packet, and then respectively sends, through the first channel and the second channel, to the first RAN device, the first packet and the third packet that each have the same data packet of the first service flow and the same sequence number of the first protocol layer. The first RAN device respectively converts the sequence number that is of the first protocol layer and that is carried in the first packet and the sequence number that is of the first protocol layer and that is carried in the third packet into sequence numbers of a second protocol layer to obtain the second packet and the fourth packet, and then sends, through the third channel and the fourth channel, to the second device, the second packet and the fourth packet that each have the same data packet of the first service flow and the same sequence number of the second protocol layer. The second device deduplicates the second packet and the fourth packet by using an entity of the second protocol layer, to obtain the data packet of the first service flow.

Therefore, the present invention discloses a packet transmission method, including:

A first access network device receives a first packet that is from a first device. The first packet includes a sequence number of a first protocol layer and a data packet of a first service flow (refer to the description in step 201).

If the first access network device determines that conversion of the sequence number of the first protocol layer needs to be performed on the first packet, the first access network device determines, based on the sequence number of the first protocol layer of the first packet, a sequence number that is of a second protocol layer and that corresponds to the data packet (refer to the description in step 202).

The first access network device sends a second packet to a second device. The second packet includes the sequence number of the second protocol layer and the data packet (refer to the description in step 203).

In one implementation, that the first access network device determines that conversion of the sequence number of the first protocol layer needs to be performed on the first packet includes: The first access network device determines that a redundant transmission path exists between the first access network device and the second device.

In one implementation, that the first access network device determines that conversion of the sequence number of the first protocol layer needs to be performed on the first packet includes: The first access network device determines, based on an indication received from a core network control plane, that the conversion of the sequence number of the first protocol layer needs to be performed on the first packet.

In one implementation, the method further includes:

The first access network device receives a third packet that is from the first device. The third packet includes a sequence number of the first protocol layer and the data packet (refer to the description in step 204).

If the first access network device determines that conversion of the sequence number of the first protocol layer needs to be performed on the third packet, the first access network device determines, based on the sequence number of the first protocol layer of the third packet, the sequence number that is of the second protocol layer and that corresponds to the data packet (refer to the description in step 205).

The first access network device sends a fourth packet to the second device. The fourth packet includes a sequence number of the second protocol layer and the data packet, the sequence number that is of the first protocol layer and that is included in the first packet is the same as the sequence number that is of the first protocol layer and that is included in the third packet, and the sequence number that is of the second protocol layer and that is included in the second packet is the same as the sequence number that is of the second protocol layer and that is included in the fourth packet (refer to the description in step 206).

In one implementation, the method further includes: The first access network device records a correspondence between the sequence number of the first protocol layer of the first packet and the sequence number that is of the second protocol layer and that corresponds to the data packet. The first access network device receives a third packet that is from the first device. The third packet includes a sequence number of the first protocol layer and the data packet. If the first access network device determines that conversion of the sequence number of the first protocol layer needs to be performed on the third packet, the first access network device determines, based on the correspondence and the sequence number of the first protocol layer of the third packet, the sequence number that is of the second protocol layer and that corresponds to the data packet. The first access network device sends a fourth packet to the second device. The fourth packet includes a sequence number of the second protocol layer and the data packet. The sequence number that is of the first protocol layer and that is included in the first packet is the same as the sequence number that is of the first protocol layer and that is included in the third packet, and the sequence number that is of the second protocol layer and that is included in the second packet is the same as the sequence number that is of the second protocol layer and that is included in the fourth packet.

In one implementation, that the first access network device determines, based on the sequence number of the first protocol layer of the first packet, a sequence number that is of a second protocol layer and that corresponds to the data packet includes: The first access network device substitutes the sequence number of the first protocol layer of the first packet into a preset function by using the sequence number as an input parameter, and determines the sequence number that is of the second protocol layer and that corresponds to the data packet.

In one implementation, the method further includes: The first access network device establishes an entity of the second protocol layer. The entity of the second protocol layer corresponds to the first service flow, and corresponds only to the first service flow.

In one implementation, the method further includes: The first access network device establishes an entity of the second protocol layer. The entity of the second protocol layer corresponds to a plurality of service flows, the plurality of service flows include the first service flow, and the first packet further includes a quality of service flow identifier QFI. If the QFI is used to identify the first service flow, that the first access network device determines, based on the sequence number of the first protocol layer of the first packet, the sequence number that is of the second protocol layer and that corresponds to the data packet includes: The entity of the second protocol layer of the first access network device determines, based on the sequence number of the first protocol layer and the QFI, the sequence number that is of the second protocol layer and that corresponds to the data packet.

In one implementation, the third packet further includes the QFI, and that the first access network device determines, based on the sequence number of the first protocol layer of the third packet, the sequence number that is of the second protocol layer and that corresponds to the data packet includes: The entity of the second protocol layer of the first access network device determines, based on the sequence number of the first protocol layer and the QFI, the sequence number that is of the second protocol layer and that corresponds to the data packet.

In one implementation, the plurality of service flows are ultra-reliable low-latency communication URLLC service flows.

In one implementation, that the first access network device receives a first packet that is from the first device includes: The first access network device receives, through a first channel, the first packet that is from the first device.

That the first access network device receives a third packet that is from the first device includes: The first access network device receives, through a second channel, the third packet that is from the first device.

That the first access network device sends a second packet to a second device includes: The first access network device sends the second packet to the second device through a third channel.

That the first access network device sends a fourth packet to the second device includes: The first access network device sends the fourth packet to the second device through a fourth channel.

In one implementation, the first device is a user plane network element, the second device is a terminal, the first channel and the second channel are two independent core network tunnels between the first access network device and the user plane network element, and the third channel and the fourth channel are two independent radio channels between the first access network device and the terminal; or the first device is a user plane network element, the second device is a terminal, the first channel and the second channel are two independent core network tunnels between the first access network device and the user plane network element, the third channel is a radio channel between the first access network device and the terminal, the fourth channel is a radio channel among the first access network device, a second access network device, and the terminal, the first access network device is a master access network device, and the second access network device is a secondary access network device; or the first device is a terminal, the second device is a user plane network element, the first channel and the second channel are two independent radio channels between the first access network device and the terminal, and the third channel and the fourth channel are two independent core network tunnels between the first access network device and the user plane network element; or the first device is a terminal, the second device is a user plane network element, the first channel is a radio channel between the first access network device and the terminal, the second channel is a radio channel among the first access network device, a second access network device, and the terminal, the third channel and the fourth channel are two independent core network tunnels between the first access network device and the user plane network element, the first access network device is a master access network device, and the second access network device is a secondary access network device.

In one implementation, the first device is a terminal, the second device is a user plane network element, the first protocol layer is a packet data convergence protocol PDCP layer or a service data adaptation protocol SDAP layer, and the second protocol layer is a general packet radio service technology tunneling protocol-user plane GTP-U layer or a high reliability protocol HRP layer; or the first device is a user plane network element, the second device is a terminal, the first protocol layer is a GTP-U layer or an HRP layer, and the second protocol layer is a PDCP layer or an SDAP layer.

Figure 9:
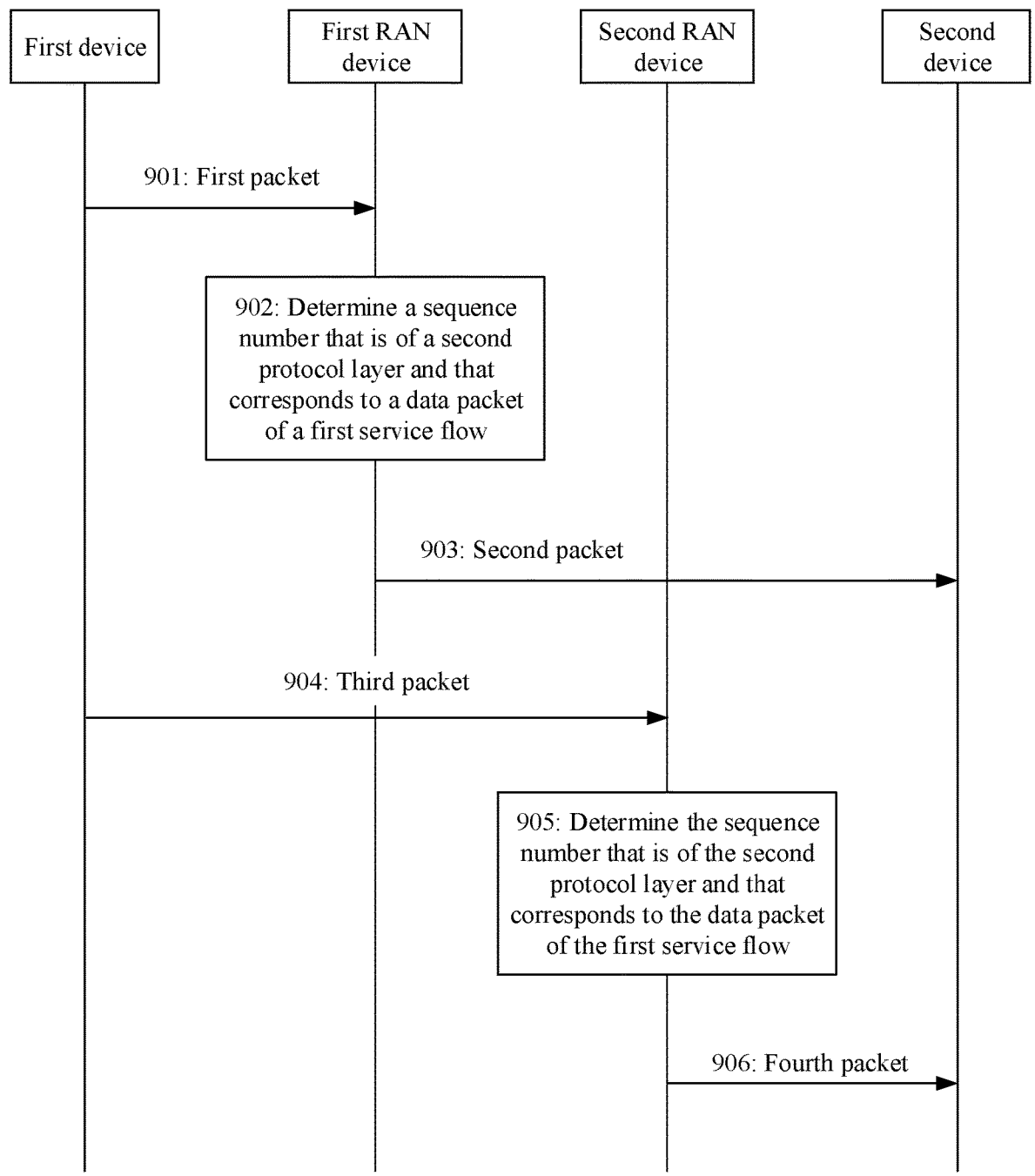
FIG. 9 is another schematic flowchart of packet transmission method according to this application.

FIG. 9 is another schematic diagram of packet transmission method according to this application. The method is applicable to a DC scenario; to be specific, a terminal simultaneously establishes connections to a first RAN device and a second RAN device. The first RAN device is also referred to as an M-RAN device, and the second RAN device is also referred to as an S-RAN device. A tunnel connection exists between the first RAN device and a UPF, a tunnel connection also exists between the second RAN device and the UPF, and the tunnel connection is also referred to as a channel in this application.

The method includes the following steps.

Step 901: A first device sends a first packet to a first RAN device. Correspondingly, the first access network device may receive the first packet.

Step 902: If the first RAN device determines that conversion of a sequence number of a first protocol layer needs to be performed on the first packet, the first RAN device determines, based on the sequence number of the first protocol layer of the first packet, a sequence number that is of a second protocol layer and that corresponds to a data packet of a first service flow.

Step 903: The first RAN device sends a second packet to a second device. Correspondingly, the second device may receive the second packet.

Step 904: The first device sends a third packet to the second RAN device. Correspondingly, the second access network device may receive the third packet.

Step 905: If the second RAN device determines that conversion of the sequence number of the first protocol layer needs to be performed on the third packet, the second RAN device determines, based on the sequence number of the first protocol layer of the third packet, the sequence number that is of the second protocol layer and that corresponds to the data packet of the first service flow.

Step 906: The second RAN device sends a fourth packet to the second device. Correspondingly, the second device may receive the fourth packet.

A specific implementation process of step 901 to step 903 is similar to step 201 to step 203 in the embodiment shown in FIG. 2. For details, refer to the foregoing descriptions. Details are not described herein again.

A specific implementation process of step 904 and step 903 is also similar to step 201 to step 203 in the embodiment shown in FIG. 2. For details, refer to the foregoing descriptions. Details are not described herein again.

In the foregoing embodiment, the first device supports the first protocol layer, and the first device replicates a packet at the first protocol layer. The second device supports the second protocol layer, and the second device deduplicates the packet at the second protocol layer. Therefore, the first device generates the sequence number of the first protocol layer at the first protocol layer, replicates the sequence number of the first protocol layer and the data packet of the first service flow, and respectively sends the first packet and the third packet to the first RAN device and the second RAN device. The third packet and the first packet each include the same data packet of the first service flow and the same sequence number of the first protocol layer. Further, the first RAN device and the second RAN device separately obtain the sequence number of the second protocol layer based on the sequence number of the first protocol layer, then the first RAN device sends the second packet to the second device, and the second RAN device sends the fourth packet to the second device. The fourth packet and the second packet each include the same data packet of the first service flow and the same sequence number of the second protocol layer. The second device may deduplicate, at the second protocol layer, the second packet and the fourth packet based on the sequence number of the second protocol layer, thereby transmitting the data packet of the first service flow with high reliability.

Figure 10:
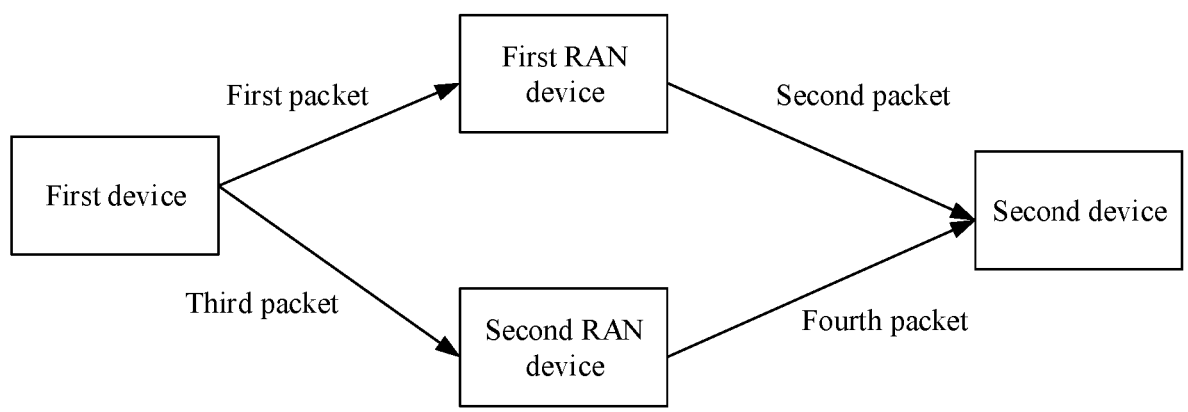
FIG. 10 is another schematic diagram of packet transmission according to this application.

FIG. 10 is a schematic diagram of packet transmission according to this application. The first RAN device shown in the figure may also be referred to as an M-RAN device, and the second RAN device may also be referred to as an S-RAN device. In the example, a first device sends a first packet to the first RAN device through a first channel, and sends a third packet to the second RAN device through a second channel. The first RAN device obtains a second packet based on the first packet, and the second RAN device obtains a fourth packet based on the third packet. For a specific implementation process, refer to the foregoing embodiment. Then, the first RAN device sends the second packet to a second device through a third channel, and sends the fourth packet to the second device through a fourth channel.

Specifically, when the first device is a UPF, and the second device is a terminal, the first channel is a core network tunnel between the first RAN device and the UPF, the second channel is a core network tunnel between the second RAN device and the UPF, the third channel is a radio channel between the first RAN device and the terminal, and the fourth channel is a radio channel between the second RAN device and the terminal.

When the first device is a terminal, and the second device is a UPF, the first channel is a radio channel between the first RAN device and the terminal, the second channel is a radio channel between the second RAN device and the terminal, the third channel is a core network tunnel between the first RAN device and the UPF, and the fourth channel is a core network tunnel between the second RAN device and the UPF.

In the example shown in FIG. 10, when the first device is the terminal, and the second device is the UPF, a first protocol layer may be a PDCP layer, or an SDAP layer, and a second protocol layer may be a GTP-U layer, or an HRP layer. When the first device is the UPF, and the second device is the terminal, a first protocol layer may be a GTP-U layer or an HRP layer, and a second protocol layer is a PDCP layer or an SDAP layer.

The following uses the PDCP layer and the GTP-U layer as an example to provide different implementations of the example shown in FIG. 10.

Method 1: Establish an association between a PDCP entity 0 of the terminal, a PDCP entity 1 of the M-RAN device, and a PDCP entity 2 of the S-RAN device, and establish an association between a GTP-U entity 0 of the UPF, a GTP-U entity 1 of the M-RAN device, and a GTP-U entity 2 of the S-RAN device.

Figure 11:
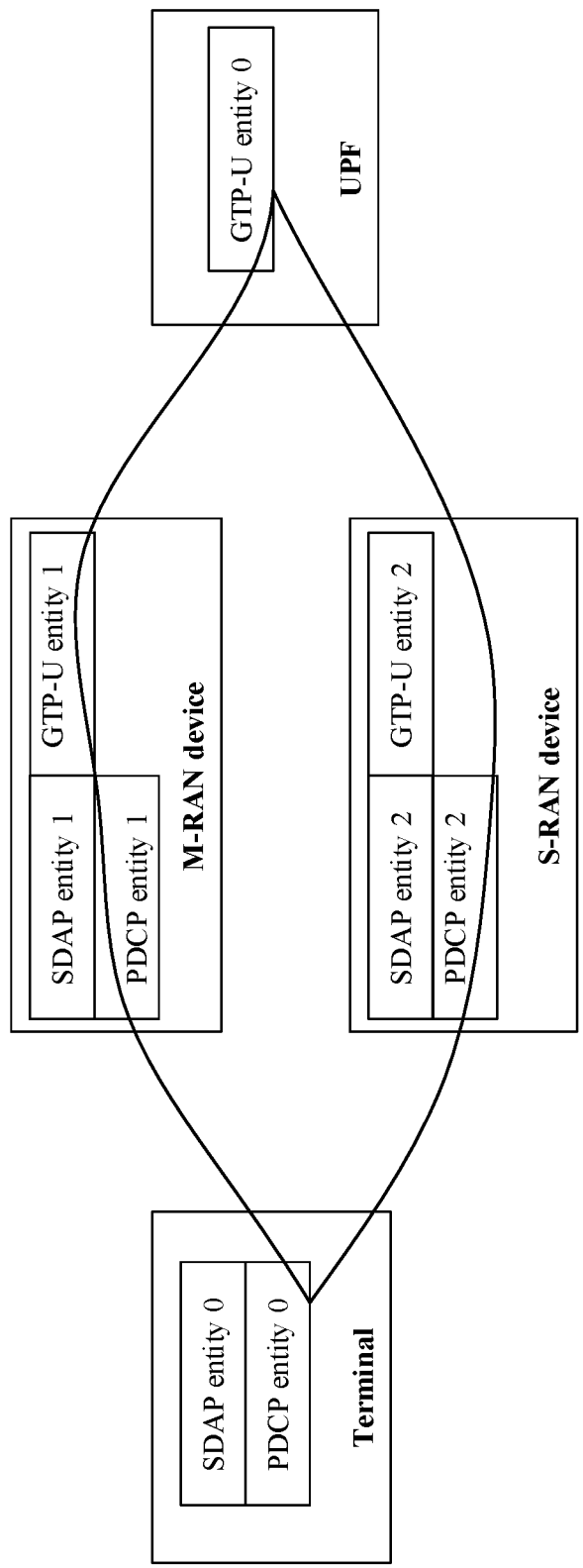
FIG. 11 is another schematic diagram of packet transmission according to this application.

FIG. 11 is another schematic diagram of packet transmission according to this application. The PDCP entity 0 of the terminal, the PDCP entity 1 of the M-RAN device, and the PDCP entity 2 of the S-RAN device may be configured to process a first service flow, and the association between the PDCP entity 0, the PDCP entity 1, and the PDCP entity 2 is established. The GTP-U entity 0 of the UPF, the GTP-U entity 1 of the M-RAN device, and the GTP-U entity 2 of the S-RAN device may be configured to process the first service flow, and the association between the GTP-U entity 0, the GTP-U entity 1, and the GTP-U entity 2 is established. For example, in a radio resource control (RRC) connection process, the association between the PDCP entity 0, the PDCP entity 1, and the PDCP entity 2 may be established, and the association between the GTP-U entity 0, the GTP-U entity 1, and the GTP-U entity 2 may be established.

In an uplink direction, the terminal replicates a data packet of the first service flow at the PDCP entity 0, to obtain the first packet and the third packet, sends the first packet to the M-RAN device, and sends the third packet to the S-RAN device. Then, the GTP-U entity 1 of the M-RAN device obtains the second packet based on the first packet and sends the second packet to the UPF, and the GTP-U entity 2 of the S-RAN device obtains the fourth packet based on the third packet and sends the fourth packet to the UPF. The GTP-U entity 0 of the UPF deduplicates the second packet and the fourth packet. Because an association exists between the GTP-U entity 0, the GTP-U entity 1, and the GTP-U entity 2, the GTP-U entity 0 may implement deduplication processing on the second packet and the fourth packet.

In a downlink direction, the UPF replicates the data packet of the first service flow at the GTP-U entity 0, to obtain the first packet and the third packet, sends the first packet to the M-RAN device, and sends the third packet to the S-RAN device. Then, the PDCP entity 1 of the M-RAN device obtains the second packet based on the first packet and sends the second packet to the terminal, and the PDCP entity 2 of the S-RAN device obtains the fourth packet based on the third packet and sends the fourth packet to the terminal. The PDCP entity 0 of the terminal deduplicates the second packet and the fourth packet. Because an association exists between the PDCP entity 0, the PDCP entity 1, and the PDCP entity 2, the PDCP entity 0 may implement deduplication processing on the second packet and the fourth packet.

Method 2: Establish an association between a PDCP entity 0 of the terminal, a PDCP entity 1 of the M-RAN device, and a PDCP entity 1 of the S-RAN device, and establish an association between a GTP-U entity 0 of the UPF, a GTP-U entity 1 of the M-RAN device, and a GTP-U entity 2 of the S-RAN device.

Figure 12:
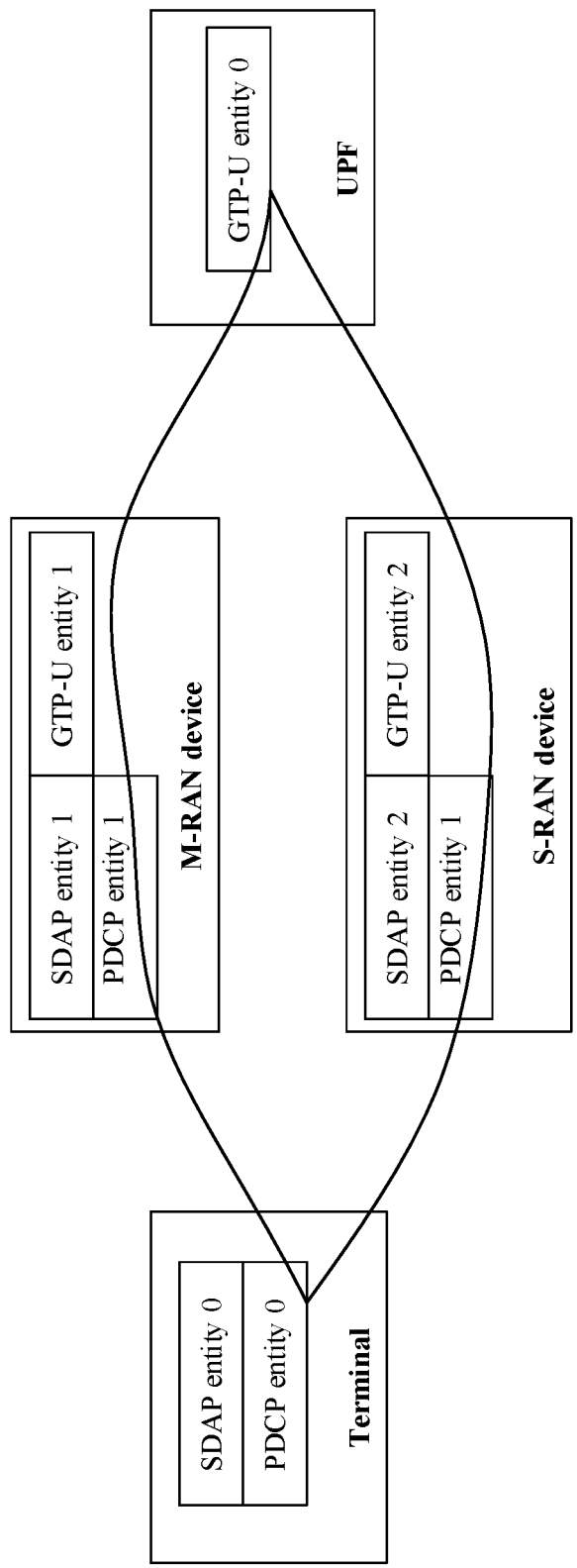
FIG. 12 is another schematic diagram of packet transmission according to this application.

FIG. 12 is another schematic diagram of packet transmission according to this application. The PDCP entity 0 of the terminal, the PDCP entity 1 of the M-RAN device, and the PDCP entity 1 of the S-RAN device may be configured to process a first service flow, and the association between the PDCP entity 0 of the terminal, the PDCP entity 1 of the M-RAN device, and the PDCP entity 1 of the S-RAN device is established. The GTP-U entity 0 of the UPF, the GTP-U entity 1 of the M-RAN device, and the GTP-U entity 2 of the S-RAN device may be configured to process the first service flow, and the association between the GTP-U entity 0 of the UPF, the GTP-U entity 1 of the M-RAN device, and the GTP-U entity 2 of the S-RAN device is established.

A main difference between Method 2 and Method 1 lies in that, PDCP entities that are respectively established by the M-RAN device and the S-RAN device in the second method and that are used to process the first service flow have a same identifier. As shown in FIG. 12, all entity identifiers of the M-RAN device and the S-RAN device are used to identify the PDCP entity 1.

In this way, the association between PDCP entities of the terminal, the M-RAN device, and the S-RAN device may be established in the following manner: The M-RAN device creates the PDCP entity 1, and initiates RRC connection establishment to the terminal. The terminal establishes the PDCP entity 0. Then, the M-RAN device sends an addition request to the S-RAN device, where the addition request may carry information about the PDCP entity 1, so that the identifier of the PDCP entity established by the S-RAN device is the same as the identifier of the PDCP entity 1.

Method 3: Establish an association between a PDCP entity 01 of the terminal and a PDCP entity 1 of the M-RAN device, establish an association between a PDCP entity 02 of the terminal and a PDCP entity 2 of the S-RAN device, establish an association between the PDCP entity 01 and the PDCP entity 02 of the terminal, and establish an association between a GTP-U entity 0 of the UPF, a GTP-U entity 1 of the M-RAN device, and a GTP-U entity 2 of the S-RAN device.

Figure 13:
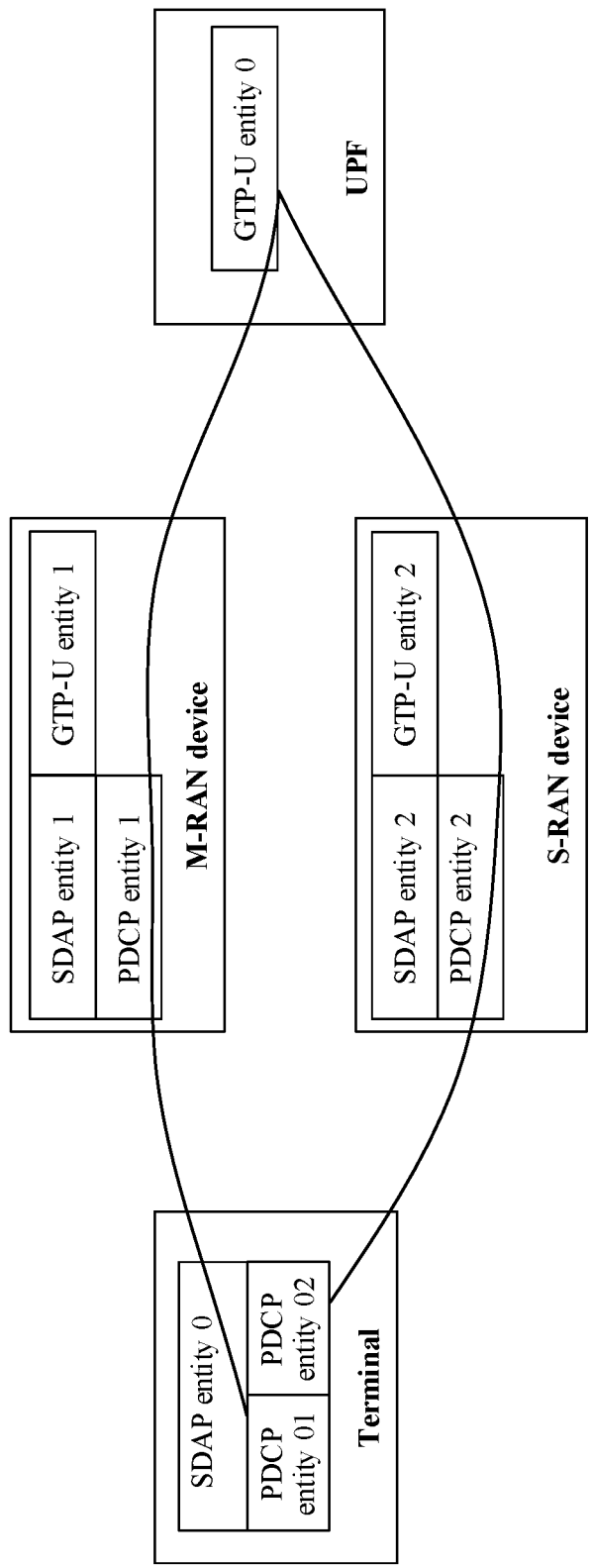
FIG. 13 is another schematic diagram of packet transmission according to this application.

FIG. 13 is another schematic diagram of packet transmission according to this application. The PDCP entity 01 of the terminal, the PDCP entity 02 of the terminal, the PDCP entity 1 of the M-RAN device, and the PDCP entity 2 of the S-RAN device may be configured to process a first service flow. The association between the PDCP entity 01 of the terminal and the PDCP entity 1 of the M-RAN device is established, the association between the PDCP entity 02 of the terminal and the PDCP entity 2 of the S-RAN device is established, and the association between the PDCP entity 01 and the PDCP entity 02 of the terminal is established. The GTP-U entity 0 of the UPF, the GTP-U entity 1 of the M-RAN device, and the GTP-U entity 2 of the S-RAN device may be configured to process the first service flow, and the association between the GTP-U entity 0 of the UPF, the GTP-U entity 1 of the M-RAN device, and the GTP-U entity 2 of the S-RAN device is established.

Based on the method, there are two PDCP entities on the terminal, and the two PDCP entities respectively correspond to the PDCP entity 1 and the PDCP entity 2. The two PDCP entities on the terminal are in a master/secondary relationship. For example, the PDCP entity 01 is a master PDCP (M-PDCP) entity, and may be configured to replicate and deduplicate a packet; and the PDCP entity 02 is a secondary PDCP (S-PDCP) entity, and may be configured to forward the packet.

Based on the example shown in FIG. 13, the following describes an implementation of establishing an association between PDCP entities, and the implementation includes the following steps.

Step 1: The M-RAN device creates the PDCP entity 1, and initiates an RRC connection establishment process to the terminal.

In an RRC connection process, the M-RAN device sends first indication information to the terminal, and the first indication information is used to indicate, to the terminal, that the PDCP entity 1 corresponds to an M-PDCP entity, so that the PDCP entity 01 that is established by the terminal and that corresponds to the PDCP entity 1 is the M-PDCP entity. It may also be understood that the M-RAN device sends an indication to the terminal, to notify the terminal that the established PDCP entity 01 is the M-PDCP entity.

Step 2: The terminal establishes the PDCP entity 01, and learns, based on the first indication information in step 1, that the PDCP entity 01 is the M-PDCP entity.

Step 3: The M-RAN device sends an addition request to the S-RAN device, and the addition request may carry second indication information, to notify the S-RAN device that the established PDCP entity 2 corresponds to an S-PDCP entity.

Step 4: The S-RAN device returns an addition response.

Step 5: The M-RAN device initiates an RRC connection reconfiguration process to the terminal.

In the process, the M-RAN device sends third indication information to the terminal, to notify the terminal that the established PDCP entity 02 is the S-PDCP entity. It should be noted that, if an RRC connection exists between the S-RAN device and the terminal, the S-RAN device may also send the third indication information to the terminal, to notify the terminal that the established PDCP entity 02 is the S-PDCP entity.

Based on the example shown in FIG. 13, in the downlink direction, the terminal receives, by using the M-PDCP entity, the third packet sent by the M-RAN device, and receives, by using the S-PDCP entity, the fourth packet sent by the S-RAN device. The S-PDCP entity forwards the fourth packet to the M-PDCP entity, and the M-PDCP entity deduplicates a packet. In the uplink direction, the terminal replicates the packet on the M-PDCP entity to obtain the first packet and the third packet, and the terminal sends the first packet to the M-RAN device by using the M-PDCP entity, and sends the third packet to the S-RAN device by using the M-PDCP entity and the S-PDCP entity.

It may be understood that to implement the foregoing functions, each network element includes a corresponding hardware structure and/or software module for implementing each function. A person of ordinary skill in the art should easily be aware that, in combination with the examples described in the embodiments disclosed in this specification, units and algorithms steps may be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 14:
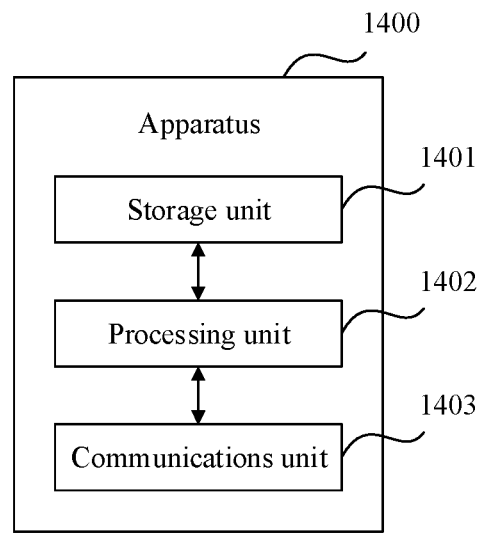
FIG. 14 is a schematic diagram of an apparatus according to this application.

When an integrated unit is used, FIG. 14 is a block diagram of a possible example of an apparatus according to an embodiment of the present invention. The apparatus 1400 may exist in a form of software. The apparatus 1400 may include a processing unit 1402 and a communications unit 1403. In an implementation, the communications unit 1403 may include a receiving unit and a sending unit. The processing unit 1402 is configured to control and manage an action of the apparatus 1400. The communications unit 1403 is configured to support the apparatus 1400 in communicating with another network entity. The apparatus 1400 may further include a storage unit 1401, configured to store program code and data that are of the apparatus 1400.

The processing unit 1402 may be a processor or a controller, for example, may be a general purpose central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processing unit 1402 may implement or execute various example logical blocks, modules, and circuits described with reference to content disclosed in the present invention. The processor may be a combination of processors implementing a computing function, for example, a combination including one or more microprocessors, or a combination of the DSP and a microprocessor. The communications unit 1403 may be a communications interface, a transceiver, a transceiver circuit, or the like, where the communications interface is a general name, and may include a plurality of interfaces during specific implementation. The storage unit 1401 may be a memory.

In an embodiment, the apparatus 1400 may be an access network device, or may be a chip in an access network device. The access network device may be configured to implement operations performed by the first access network device or the second access network device in the foregoing embodiments.

For example, when the communications unit 1403 includes a sending unit and a receiving unit. The receiving unit is configured to receive a first packet that is from a first device, where the first packet includes a sequence number of a first protocol layer and a data packet of a first service flow; the processing unit is configured to: if it is determined that conversion of the sequence number of the first protocol layer needs to be performed on the first packet, determine, based on the sequence number of the first protocol layer of the first packet, a sequence number that is of a second protocol layer and that corresponds to the data packet; and the sending unit is configured to send a second packet to a second device, where the second packet includes the sequence number of the second protocol layer and the data packet.

In one implementation, the processing unit is specifically configured to determine that a redundant transmission path exists between the apparatus 1400 and the second device.

In one implementation, the processing unit is specifically configured to determine, based on an indication received from a core network control plane, that the conversion of the sequence number of the first protocol layer needs to be performed on the first packet.

In one implementation, the receiving unit is further configured to: receive a third packet that is from the first device, where the third packet includes a sequence number of the first protocol layer and the data packet; the processing unit is further configured to: if it is determined that conversion of the sequence number of the first protocol layer needs to be performed on the third packet, determine, based on the sequence number of the first protocol layer of the third packet, the sequence number that is of the second protocol layer and that corresponds to the data packet; and the sending unit is further configured to send a fourth packet to the second device, where the fourth packet includes a sequence number of the second protocol layer and the data packet, the sequence number that is of the first protocol layer and that is included in the first packet is the same as the sequence number that is of the first protocol layer and that is included in the third packet, and the sequence number that is of the second protocol layer and that is included in the second packet is the same as the sequence number that is of the second protocol layer and that is included in the fourth packet.

In one implementation, the processing unit is further configured to record a correspondence between the sequence number of the first protocol layer of the first packet and the sequence number that is of the second protocol layer and that corresponds to the data packet; the receiving unit is further configured to receive a third packet that is from the first device, where the third packet includes a sequence number of the first protocol layer and the data packet; the processing unit is further configured to: if it is determined that conversion of the sequence number of the first protocol layer needs to be performed on the third packet, determine, based on the correspondence and the sequence number that is of the first protocol layer of the third packet, the sequence number that is of the second protocol layer and that corresponds to the data packet; and the sending unit is further configured to send a fourth packet to the second device, where the fourth packet includes a sequence number of the second protocol layer and the data packet, the sequence number that is of the first protocol layer and that is included in the first packet is the same as the sequence number that is of the first protocol layer and that is included in the third packet, and the sequence number that is of the second protocol layer and that is included in the second packet is the same as the sequence number that is of the second protocol layer and that is included in the fourth packet.

In one implementation, the processing unit is specifically configured to substitute the sequence number of the first protocol layer of the first packet into a preset function by using the sequence number as an input parameter, to determine the sequence number that is of the second protocol layer and that corresponds to the data packet.

In one implementation, the processing unit is further configured to establish an entity of the second protocol layer, where the entity of the second protocol layer corresponds to the first service flow, and corresponds only to the first service flow.

In one implementation, the processing unit is further configured to establish an entity of the second protocol layer, where the entity of the second protocol layer corresponds to a plurality of service flows, the plurality of service flows include the first service flow, the first packet further includes a QFI, and the QFI is used to identify the first service flow; and the entity of the second protocol layer determines, based on the sequence number of the first protocol layer and the QFI, the sequence number that is of the second protocol layer and that corresponds to the data packet.

In one implementation, the third packet further includes the QFI, and the processing unit determines, by using the entity of the second protocol layer and based on the sequence number of the first protocol layer and the QFI, the sequence number that is of the second protocol layer and that corresponds to the data packet.

In one implementation, the plurality of service flows are URLLC service flows.

In one implementation, the receiving unit is specifically configured to: receive, through a first channel, the first packet that is from the first device, and receive, through a second channel, the third packet that is from the first device. The sending unit is specifically configured to send the second packet to the second device through a third channel, and send the fourth packet to the second device through a fourth channel.

In one implementation, the apparatus is a first access network device, the first device is a user plane network element, the second device is a terminal, the first channel and the second channel are two independent core network tunnels between the first access network device and the user plane network element, and the third channel and the fourth channel are two independent radio channels between the first access network device and the terminal; or the apparatus 1400 is a first access network device, the first device is a user plane network element, the second device is a terminal, the first channel and the second channel are two independent core network tunnels between the first access network device and the user plane network element, the third channel is a radio channel between the first access network device and the terminal, the fourth channel is a radio channel among the first access network device, a second access network device, and the terminal, the first access network device is a master access network device, and the second access network device is a secondary access network device; or the apparatus 1400 is a first access network device, the first device is a terminal, the second device is a user plane network element, the first channel and the second channel are two independent radio channels between the first access network device and the terminal, and the third channel and the fourth channel are two independent core network tunnels between the first access network device and the user plane network element; or the apparatus 1400 is a first access network device, the first device is a terminal, the second device is a user plane network element, the first channel is a radio channel between the first access network device and the terminal, the second channel is a radio channel among the first access network device, a second access network device, and the terminal, the third channel and the fourth channel are two independent core network tunnels between the first access network device and the user plane network element, the first access network device is a master access network device, and the second access network device is a secondary access network device.

In one implementation, the first device is a terminal, the second device is a user plane network element, the first protocol layer is a PDCP layer or an SDAP layer, and the second protocol layer is a GTP-U layer or an HRP layer; or the first device is a user plane network element, the second device is a terminal, the first protocol layer is a GTP-U layer or an HRP layer, and the second protocol layer is a PDCP layer or an SDAP layer.

Figure 15:
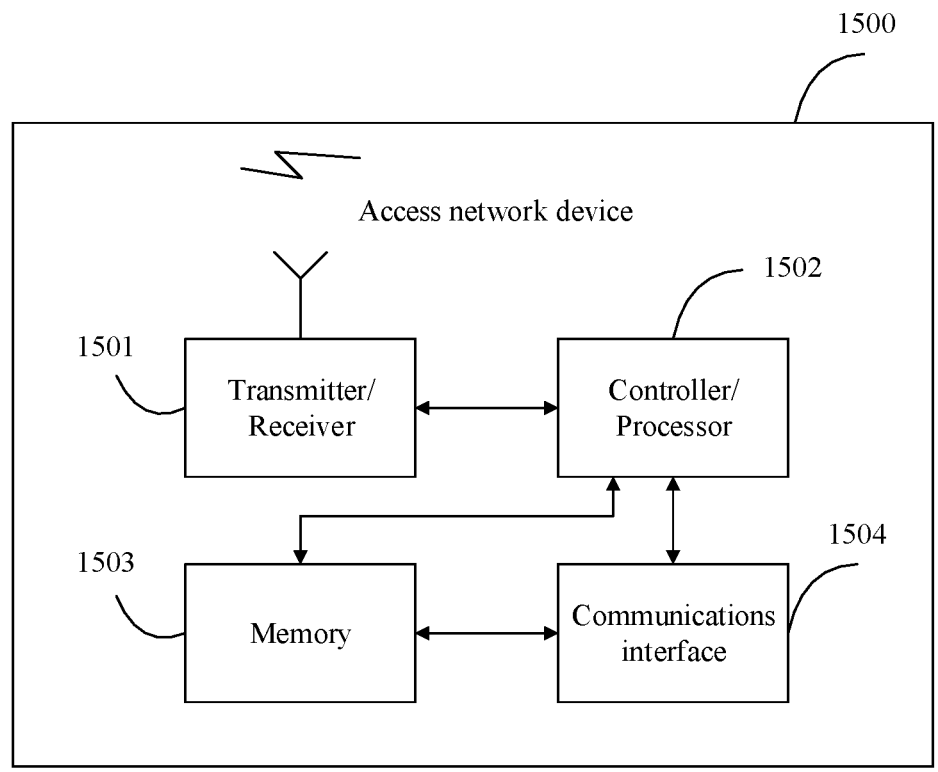
FIG. 15 is a schematic diagram of an access network device according to this application.

FIG. 15 is another schematic structural diagram of an access network device according to an embodiment of the present invention. The access network device 1500 includes a processor 1502 and a communications interface 1504. The processor 1502 may also be a controller, and is represented as the "controller/processor 1502" in FIG. 15. The communications interface 1504 is configured to support the access network device in communicating with another network element (for example, a mobility management network element). Further, the access network device 1500 may include a transmitter/receiver 1501. The transmitter/receiver 1501 is configured to support the access network device in communicating with the terminal and the user plane network element in the foregoing embodiments. The processor 1502 may perform various functions for communicating with the terminal. In an uplink, an uplink signal that is from the terminal is received through an antenna, is demodulated (for example, a high frequency signal is demodulated into a baseband signal) by the transmitter/receiver 1501, and is further processed by the processor 1502 to recover service data and signaling information that are sent by the terminal. In a downlink, service data and a signaling message are processed by the processor 1502, and are modulated (for example, a baseband signal is modulated into a high frequency signal) by the transmitter/receiver 1501 to generate a downlink signal, and the downlink signal is transmitted to the terminal through an antenna. It should be noted that the foregoing demodulation or modulation function may also be implemented by the processor 1502.

For example, the processor 1502 is further configured to perform the processing processes of the access network device (for example, the first access network device, or the second access network device) in the method shown in FIG. 2 and FIG. 9 and/or another process of the technical solutions described in this application.

Further, the access network device 1500 may further include a memory 1503, and the memory 1503 is configured to store program code and data of the access network device 1500.

It may be understood that, FIG. 15 shows only a simplified design of the access network device 1500. In actual application, the access network device 1500 may include any quantity of transmitters, receivers, processors, controllers, memories, communications units, and the like, and all access network devices that can implement the embodiments of the present invention fall within the protection scope of the embodiments of the present invention.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The various illustrative logical units and circuits described in the embodiments of this application may implement or operate the described functions by using a general processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor, so that the processor may read information from the storage medium and write information to the storage medium. Optionally, the storage medium may further be integrated into the processor. The processor and the storage medium may be disposed in an ASIC, and the ASIC may be disposed in a terminal device. In some embodiments, the processor and the storage medium may be alternatively disposed in different components of the terminal device.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

Although this application is described with reference to specific features and the embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. It is clear that, a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A method comprising:
   receiving, by a first access network device, a first packet that is from a first device, wherein the first packet comprises a sequence number of a first protocol layer, a data packet of a first service flow, and a quality of service flow identifier (QFI) that is used to identify the first service flow;

when the first access network device determines that conversion of the sequence number of the first protocol layer is to be performed on the first packet, determining, by the first access network device based on the sequence number of the first protocol layer of the first packet and the QFI, a sequence number that is of a second protocol layer and that corresponds to the data packet wherein, when replicating a packet at a SDAP layer, the sequence number of the second protocol layer is based on the QFI and an SDAP sequence number; and sending, by the first access network device, a second packet to a second device, wherein the second packet comprises the sequence number of the second protocol layer and the data packet.

2. The method according to claim 1, wherein the first access network device determining that conversion of the sequence number of the first protocol layer needs to be performed on the first packet further comprises:

determining, by the first access network device, that a redundant transmission path exists between the first access network device and the second device.

3. The method according to claim 1, wherein the first access network device determining that conversion of the sequence number of the first protocol layer needs to be performed on the first packet further comprises:

determining, by the first access network device based on an indication received from a core network control plane, that the conversion of the sequence number of the first protocol layer is to be performed on the first packet.

4. The method according to claim 1, wherein the method further comprises:

receiving, by the first access network device, a third packet that is from the first device, wherein the third packet comprises a sequence number of the first protocol layer and the data packet;

when the first access network device determines that conversion of the sequence number of the first protocol layer needs to be performed on the third packet, determining, by the first access network device based on the sequence number of the first protocol layer of the third packet, the sequence number that is of the second protocol layer and that corresponds to the data packet; and sending, by the first access network device, a fourth packet to the second device, wherein the fourth packet comprises a sequence number of the second protocol layer and the data packet, the sequence number that is of the first protocol layer and that is comprised in the first packet is the same as the sequence number that is of the first protocol layer and that is in the third packet, and the sequence number that is of the second protocol layer and that is comprised in the second packet is the same as the sequence number that is of the second protocol layer and that is comprised in the fourth packet.

5. The method according to claim 1, wherein determining, by the first access network device based on the sequence number of the first protocol layer of the first packet, the sequence number that is of the second protocol layer and that corresponds to the data packet further comprises:

substituting, by the first access network device, the sequence number of the first protocol layer of the first packet into a preset function by using the sequence number as an input parameter, to determine the sequence number of the second protocol layer that corresponds to the data packet.

6. The method according to claim 1, wherein the method further comprises:

establishing, by the first access network device, an entity of the second protocol layer, wherein the entity of the second protocol layer corresponds only to the first service flow.

7. The method according to claim 1, wherein the first service flow is an ultra-reliable low-latency communication (URLLC) service flow.

8. The method according to claim 4, wherein receiving, by the first access network device, the first packet that is from the first device further comprises:

receiving, by the first access network device through a first channel, the first packet that is from the first device;

receiving, by the first access network device, the third packet that is from the first device further comprises:

receiving, by the first access network device through a second channel, the third packet that is from the first device;

sending, by the first access network device, the second packet to the second device further comprises:

sending, by the first access network device, the second packet to the second device through a third channel; and sending, by the first access network device, the fourth packet to the second device further comprises:

sending, by the first access network device, the fourth packet to the second device through a fourth channel.

9. The method according to claim 8, wherein the first device is a user plane network element, the second device is a terminal, the first channel and the second channel are two independent core network tunnels between the first access network device and the user plane network element, and the third channel and the fourth channel are two independent radio channels between the first access network device and the terminal.

10. The method according to claim 1, wherein the first device is a terminal, the second device is a user plane network element, the first protocol layer is a packet data convergence protocol (PDCP) layer or a service data adaptation protocol (SDAP) layer, and the second protocol layer is a general packet radio service technology tunneling protocol-user plane (GTP-U) layer or a high reliability protocol (HRP) layer; or the first device is a user plane network element, the second device is a terminal, the first protocol layer is the GTP-U layer or the HRP layer, and the second protocol layer is the PDCP layer or the SDAP layer.

11. An apparatus comprising:

a receiving unit, configured to receive a first packet that is from a first device, wherein the first packet comprises a sequence number of a first protocol layer, a data packet of a first service flow, and a quality of service flow identifier (QFI) that is used to identify the first service flow;

a processing unit, configured to:

when it is determined that conversion of the sequence number of the first protocol layer is to be performed on the first packet, determine, based on the sequence number of the first protocol layer of the first packet and the QFI, a sequence number that is of a second protocol layer and that corresponds to the data packet, wherein, when replicating a packet at a SDAP layer, the sequence number of the second protocol layer is based on the QFI and an SDAP sequence number; and a sending unit, configured to send a second packet to a second device, wherein the second packet comprises the sequence number of the second protocol layer and the data packet.

12. The apparatus according to claim 11, wherein the processing unit is further configured to determine that a redundant transmission path exists between the apparatus and the second device.

13. The apparatus according to claim 11, wherein the processing unit is further configured to determine, based on an indication received from a core network control plane, that the conversion of the sequence number of the first protocol layer needs to be performed on the first packet.

14. The apparatus according to claim 11, wherein the receiving unit is further configured to receive a third packet that is from the first device, wherein the third packet comprises a sequence number of the first protocol layer and the data packet;

the processing unit is further configured to:

when it is determined that conversion of the sequence number of the first protocol layer needs to be performed on the third packet, determine, based on the sequence number of the first protocol layer of the third packet, the sequence number that is of the second protocol layer and that corresponds to the data packet; and the sending unit is further configured to send a fourth packet to the second device, wherein the fourth packet comprises a sequence number of the second protocol layer and the data packet, the sequence number that is of the first protocol layer and that is comprised in the first packet is the same as the sequence number that is of the first protocol layer and that is comprised in the third packet, and the sequence number that is of the second protocol layer and that is comprised in the second packet is the same as the sequence number that is of the second protocol layer and that is comprised in the fourth packet.

15. The apparatus according to claim 11, wherein the processing unit is further configured to:

substitute the sequence number of the first protocol layer of the first packet into a preset function by using the sequence number as an input parameter, and determine the sequence number of the second protocol layer that corresponds to the data packet.

16. The apparatus according to claim 11, wherein the processing unit is further configured to establish an entity of the second protocol layer, wherein the entity of the second protocol layer corresponds only to the first service flow.

17. The apparatus according to claim 11, wherein the first service flow is an ultra-reliable low-latency communication (URLLC) service flow.

18. The apparatus according to claim 14, wherein the receiving unit is further configured to receive, through a first channel, the first packet that is from the first device, and receive, through a second channel, the third packet that is from the first device; and the sending unit is further configured to:

send the second packet to the second device through a third channel, and send the fourth packet to the second device through a fourth channel.

* * * * *